United States Patent
Nakano et al.

(10) Patent No.: US 9,401,907 B2
(45) Date of Patent: *Jul. 26, 2016

(54) INFORMATION PROCESSING APPARATUS AND METHOD, RECORDING MEDIUM AND PROGRAM

(71) Applicant: Sony Corporation, Tokyo (JP)

(72) Inventors: Takehiko Nakano, Kanagawa (JP); Hisato Shima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,451

(22) Filed: Jun. 19, 2014

(65) Prior Publication Data

US 2014/0304781 A1    Oct. 9, 2014

Related U.S. Application Data

(63) Continuation of application No. 13/958,376, filed on Aug. 2, 2013, now Pat. No. 8,763,124, which is a continuation of application No. 13/410,969, filed on Mar. 2, 2012, now Pat. No. 8,788,818, which is a (Continued)

(30) Foreign Application Priority Data

Jul. 28, 2003    (JP) .................................. 2003-281348

(51) Int. Cl.
*G06F 9/00* (2006.01)
*H04L 29/06* (2006.01)
(Continued)

(52) U.S. Cl.
CPC .............. *H04L 63/08* (2013.01); *H04L 9/0841* (2013.01); *H04L 9/0861* (2013.01);
(Continued)

(58) Field of Classification Search
CPC .... H04L 9/3273; H04L 63/0869; H04L 63/08
USPC ........................ 726/1, 23, 24, 25, 12; 713/169
See application file for complete search history.

(56) References Cited

U.S. PATENT DOCUMENTS

| 4,692,826 | A |   | 9/1987 | Raj et al. |
| 6,073,237 | A | * | 6/2000 | Ellison .................... G06F 21/31 380/281 |

(Continued)

FOREIGN PATENT DOCUMENTS

| EP | 0 773 647 A2 | 5/1997 |
| GB | 2337 908 A | 12/1999 |

(Continued)

OTHER PUBLICATIONS

Japanese Office Action issued May 13, 2014, in Japanese Patent Application No. 2013-111046 with English Translation.

(Continued)

*Primary Examiner* — Abu Sholeman
(74) *Attorney, Agent, or Firm* — Oblon, McClelland, Maier & Neustadt, L.L.P.

(57) ABSTRACT

An electronic device that shares a secret key with another electronic device; receives a first response request transmitted from the another electronic device; generates a first response message based on the first response request and the secret key; receives a second response request transmitted from the another electronic device; and generates a second response message based on the second response request, the second response message transmitted to the another electronic device and including authentication data generated based on the secret key. The electronic device is authorized to receive data from the another electronic device when the authentication data matches expected authentication information generated by the another electronic device, and a predetermined time elapsed from a transmission of the second response request does not expire before the second response message is received by the another electronic device.

17 Claims, 16 Drawing Sheets

Related U.S. Application Data continuation of application No. 12/886,654, filed on Sep. 21, 2010, now Pat. No. 8,407,473, which is a continuation of application No. 10/528,562, filed as application No. PCT/JP2004/009256 on Jun. 27, 2004, now Pat. No. 7,908,479.

(51) Int. Cl.
*H04L 9/08* (2006.01)
*H04L 9/32* (2006.01)

(52) U.S. Cl.
CPC ........... *H04L 9/3242* (2013.01); *H04L 9/3271* (2013.01); *H04L 63/061* (2013.01); *H04L 63/083* (2013.01); *H04L 63/0869* (2013.01); *H04L 63/107* (2013.01); *H04L 2209/603* (2013.01)

(56) References Cited

U.S. PATENT DOCUMENTS

| | | | |
|---|---|---|---|
| 6,377,589 B1 | 4/2002 | Knight et al. | |
| 6,377,792 B1* | 4/2002 | Brown | H04W 12/12 455/410 |
| 6,487,663 B1 | 11/2002 | Jaisimha et al. | |
| 6,515,575 B1 | 2/2003 | Kataoka | |
| 6,574,627 B1 | 6/2003 | Bergadano et al. | |
| 6,591,364 B1 | 7/2003 | Patel | |
| 6,633,980 B1 | 10/2003 | Johnson | |
| 6,696,919 B1 | 2/2004 | Leickel et al. | |
| 6,697,644 B2 | 2/2004 | Scherzer et al. | |
| 6,952,771 B1 | 10/2005 | Zuccherato et al. | |
| 6,952,772 B2 | 10/2005 | Deo et al. | |
| 7,058,414 B1 | 6/2006 | Rofheart et al. | |
| 7,185,204 B2 | 2/2007 | Narayanaswami et al. | |
| 7,266,682 B2 | 9/2007 | Euchner | |
| 7,483,423 B2* | 1/2009 | Grewal | H04L 63/123 370/252 |
| 7,503,068 B2* | 3/2009 | Kaniyar | H04L 47/34 713/151 |
| 7,626,943 B2 | 12/2009 | Nakano | |
| 7,656,875 B2 | 2/2010 | Nakano | |
| 7,716,730 B1* | 5/2010 | Droux | H04L 63/166 713/153 |
| 7,805,606 B2 | 9/2010 | Birger et al. | |
| 7,870,089 B1 | 1/2011 | Hall et al. | |
| 7,908,479 B2 | 3/2011 | Nakano | |
| 7,921,282 B1* | 4/2011 | Mukerji | H04L 63/0428 713/151 |
| 7,934,005 B2 | 4/2011 | Fascenda | |
| 7,957,533 B2 | 6/2011 | Patel | |
| 7,962,747 B2 | 6/2011 | Nakano | |
| 8,289,880 B2* | 10/2012 | Nakano | H04L 12/2697 370/254 |
| 8,621,593 B2 | 12/2013 | Nakano et al. | |
| 2002/0012433 A1 | 1/2002 | Haverinen et al. | |
| 2002/0069303 A1 | 6/2002 | Massie | |
| 2002/0194475 A1 | 12/2002 | Ishiguro et al. | |
| 2002/0197979 A1* | 12/2002 | Vanderveen | H04L 63/0869 455/410 |
| 2003/0005193 A1 | 1/2003 | Seroussi et al. | |
| 2003/0065918 A1 | 4/2003 | Willey | |
| 2003/0184431 A1 | 10/2003 | Lundkvist | |
| 2003/0210347 A1 | 11/2003 | Kondo | |
| 2003/0217166 A1 | 11/2003 | Del Canto et al. | |
| 2004/0034773 A1 | 2/2004 | Balabine et al. | |
| 2004/0098583 A1* | 5/2004 | Weber | 713/168 |
| 2004/0172535 A1 | 9/2004 | Jakobsson et al. | |
| 2004/0236965 A1* | 11/2004 | Krohn | H04L 63/0807 726/10 |
| 2004/0240412 A1 | 12/2004 | Winget | |
| 2004/0268131 A1 | 12/2004 | Kudo et al. | |
| 2005/0147108 A1 | 7/2005 | Nakano | |
| 2005/0160450 A1 | 7/2005 | Stephens et al. | |
| 2005/0195975 A1* | 9/2005 | Kawakita | H04L 9/0822 380/30 |
| 2005/0226152 A1 | 10/2005 | Stephens et al. | |
| 2005/0287991 A1 | 12/2005 | Shima | |
| 2006/0153096 A1 | 7/2006 | Nakano | |
| 2006/0154620 A1 | 7/2006 | Shima | |
| 2006/0236363 A1 | 10/2006 | Heard et al. | |
| 2008/0077796 A1* | 3/2008 | Lund | H04L 63/0869 713/173 |
| 2008/0281966 A1* | 11/2008 | Jennings, III | H04L 29/12339 709/225 |
| 2009/0133113 A1* | 5/2009 | Schneider | G06F 21/305 726/12 |
| 2009/0290506 A1 | 11/2009 | Nakano | |
| 2010/0074122 A1 | 3/2010 | Nakano | |
| 2010/0161962 A1* | 6/2010 | Lim | G06F 21/606 713/153 |
| 2010/0161966 A1* | 6/2010 | Kwon | H04L 9/3273 713/155 |
| 2013/0022198 A1 | 1/2013 | Willey | |
| 2013/0318350 A1* | 11/2013 | Nakano | H04L 9/0841 713/168 |
| 2014/0258705 A1* | 9/2014 | Roskind | H04L 63/029 713/150 |

FOREIGN PATENT DOCUMENTS

| | | |
|---|---|---|
| JP | 4-247737 | 9/1992 |
| JP | 5-7218 | 1/1993 |
| JP | 8-46948 | 2/1996 |
| JP | 10-336178 | 12/1998 |
| JP | 11-2003249 | 7/1999 |
| JP | 2000-307603 | 11/2000 |
| JP | 2000-353056 | 12/2000 |
| JP | 2001-285284 | 10/2001 |
| JP | 2001-352322 | 12/2001 |
| JP | 2002-82834 | 3/2002 |
| JP | 2002-164899 | 6/2002 |
| JP | 2002-215029 | 7/2002 |
| JP | 2003-67256 | 3/2003 |
| JP | 2003-204325 | 7/2003 |
| JP | 2003-224556 | 8/2003 |
| JP | 2004-120736 | 4/2004 |
| JP | 2004-194295 | 7/2004 |
| JP | 2004-208145 | 7/2004 |
| JP | 2004-295337 A | 10/2004 |
| JP | 2004-334756 | 11/2004 |
| JP | 2005-5821 | 1/2005 |
| JP | 2005-45756 | 2/2005 |
| JP | 2005-86510 | 3/2005 |
| JP | 2005-204087 | 7/2005 |
| JP | 2005-204094 | 7/2005 |
| JP | 2005-252773 | 9/2005 |
| JP | 2005-269288 | 9/2005 |
| JP | 2005-534260 | 11/2005 |
| JP | 2005-534260 A | 11/2005 |
| JP | 2005-352910 | 12/2005 |
| JP | 2006-5909 | 1/2006 |
| JP | 2006-18709 | 1/2006 |
| JP | 2006-121760 | 5/2006 |
| JP | 2007-537624 | 12/2007 |
| JP | 4692826 B2 | 6/2011 |
| JP | 2012-150838 | 8/2012 |
| JP | 2012-178169 | 9/2012 |
| JP | 2012-102372 | 7/2013 |
| JP | 2013-179691 A | 9/2013 |
| JP | 5397498 B2 | 1/2014 |
| WO | WO 01/93434 A2 | 12/2001 |
| WO | WO 02/35036 A1 | 5/2002 |
| WO | WO 02/063847 A2 | 8/2002 |
| WO | WO 03/003687 A1 | 1/2003 |
| WO | WO 03/013068 A1 | 2/2003 |
| WO | WO 03/046734 A1 | 6/2003 |
| WO | WO 03/075125 A2 | 9/2003 |
| WO | WO 03/079638 A1 | 9/2003 |

(56) References Cited

FOREIGN PATENT DOCUMENTS

| WO | WO 2004/014037 A1 | 2/2004 |
|----|---|---|
| WO | WO 2004/030311 A1 | 4/2004 |
| WO | WO 2004/062204 A1 | 7/2004 |

OTHER PUBLICATIONS

Japanese Office Action issued Oct. 16, 2014 in Japanese Patent Application No. 2013-111046 (with English language translation).
Japanese Office Action issued May 13, 2014 in Patent Application No. 2013-111046 with English Translation.
Japanese Office Action issued Jul. 29, 2014 in Patent Application No. 2013-111046 with English Translation.
Office Action issued May 7, 2015 in Japanese Patent Application No. 2014-141978.
Office Action issued Sep. 1, 2015 in Japanese Patent Application No. 2013-111046 (with English language translation).
Office Action issued Mar. 26, 2013 in Japanese Application No. 2012-102371 (with English translation).
Office Action issued Mar. 26, 2013 in Japanese Application No. 2012-102372 (with English translation).
Ian Fried, "Apple limits iTunes file sharing", [online], CNET News.com, May 27, 2003, Retrieved from internet: <URL:http://news.com.com/2100-1027_3-1010541.html?tag=cd_mh>.
Hitachi Ltd., et al., "Digital Transmission Content Protection Specification vol. 1 Revision 1. 2a (Informational Version)", [online], Digital Transmission Licensing Administrator, Feb. 25, 2002, Received from internet: <URL:http://web.archive.org/web/20030604012332/www.dtcp.com/data/info_dtcp_vl.pdf>.
Hachiro Endo, "Batsuruy Man no Tameno Pasokon Katsuyo Jlssen Koza-96-Network Settei no Kakunin Ho Ho; Material Flow", Kabushiki Kaisha Ryutsu Kenkyusha, vol. 43, No. 5, p. 125, Jun. 1, 2002.
Extended European Search Report issued Mar. 3, 2011, in European Patent Application No. 10193439.6-2413.
Office Action issued Aug. 31, 2010, in Japan Patent Application No. 2005-511989 (with English translation).
"Second part Widening a secure ring based on the assumption of a network", Nikkei Electronic, published by Nikkei BP, May 10, 2004, No. 873, pp. 88-95.
Japanese Office Action issued Jul. 11, 2013 in Japanese Patent Application No. 2012-102372 with English translation, 11 pages.
Japanese Office Action issue May 13, 2014 in Japanese Patent Application No. 2013-111046 with English translation, 13 pages.
"Digital Transmission Content Protection Specification", vol. 1. (Informational Version), published on Jul. 25, 2000, 81 pages.
US 7,856,552, 12/2010, Nakano et al. (withdrawn)

\* cited by examiner

INFORMATION PROCESSING APPARATUS AND METHOD, RECORDING MEDIUM AND PROGRAM

CROSS-REFERENCE TO RELATED APPLICATIONS

This application is a continuation of and is based upon and claims the benefit of priority under 35 U.S.C. §120 for U.S. Ser. No. 13/598,376, filed Aug. 2, 2013 which is a continuation of U.S. Ser. No. 13/410,969, filed Mar. 2, 2012 which is a continuation of U.S. Ser. No. 12/886,654, filed Sep. 10, 2012 (now U.S. Pat. No. 8,407,473). U.S. Ser. No. 12/886,654 is a continuation of Ser. No. 10/528,562, filed Oct. 28, 2005 (now U.S. Pat. No. 7,908,479), the entire contents of which is incorporated herein by reference which is the national stage of PCT/JP04/09256 filed Jun. 24, 2004, and claims the benefit of priority under 35 U.S.C. §119 from Japanese Patent Application No. 2003-281348, filed Jul. 28, 2003.

FIELD OF THE INVENTION

The present invention relates to information processing apparatus and method, a recording medium and a program, and more particularly to an information processing apparatus capable of properly measuring a time taken to reach a communication partner, and to an information processing method, a recording medium and a program.

BACKGROUND ART

Recently, widespreading networks, such as a network (hereinafter called WAN (Wide Area Network)) typically represented by the Internet, which is publicly used over a wide area and a network (hereinafter called LAN (Local Area Network) which is installed in ordinary houses or the like and used locally, various data communications via these networks, are mainstream.

When image content, music content and the like are transmitted over a network, authentication and key exchange are performed for a communication partner and the content is enciphered and transmitted (refer to the following document).

DTCP Specification Volume 1 Version 1.3 (Information Version) http://www.dtcp.com/daTa/info_20040107_dtcp_Vol_1_1p3.pdf There arises herein the case that although copy and transmission in a home are permitted, content transmission to another home connected to WAN is restricted from the viewpoint of copyrights. For example, although a content of recorded television broadcast can be used if only it is used privately (in a home), if the content is transmitted via the Internet to a third party, it can be considered that this infringes the copyright, thus a restriction of this kind is therefore necessary.

Under this restriction, an apparatus (transmitter) for transmitting a content protected under copyright is required to judge whether a communication partner apparatus (receiver) for receiving the content is in the same LAN or connected via WAN (the Internet).

For example, whether the communication partner is connected via WAN (the Internet) can be known by checking from the IP address whether the communication partner is in the same subnet or by using the number (Hop Count) of IP routers through which an IP communication packet passes. However, if technologies such as VPN (Virtual Private Network) are used, even communications via WAN (the Internet) can establish a connection like the same subnet connected without an IP router. Namely, the content can be improperly acquired.

DISCLOSURE OF THE INVENTION

The present invention has been made in consideration of the above-described circumstances and aims to measure a communication distance based on a response time of a receiver to a predetermined command to thereby judge, e.g., whether or not the receiver is connected to the same LAN as that of the transmitter.

A first information processing apparatus of the present invention is characterized by having: command transmission means for, after authentication data is generated in accordance with shared data shared with a receiving apparatus, transmitting a command for requesting for a response to the receiving apparatus; authentication means for authenticating the receiving apparatus in accordance with an expected value generated based upon the shared data and the authentication data generated at the receiving apparatus; measurement means for measuring a response time taken by the receiving apparatus to respond to the command; and judgment means for judging whether data transmission to the receiving apparatus is granted or not, in accordance with an authentication result by the authentication means and the response time measured by the measurement means.

The command transmission means may transmit the command a maximum of N times to judge whether the data transmission is granted or not; and the authentication means may authenticate the receiving apparatus in accordance with the authentication data corresponding to a transmission sequence of the command and a corresponding one of the expected value.

A first information processing method of the present invention is characterized by having: a command transmission step of, after authentication data is generated in accordance with shared data shared with a receiving apparatus, transmitting a command for requesting for a response to the receiving apparatus; an authentication step of authenticating the receiving apparatus in accordance with an expected value generated based upon the shared data and the authentication data generated at the receiving apparatus; a measurement step of measuring a response time taken by the receiving apparatus to respond to the command; and a judgment step of judging whether data transmission to the receiving apparatus is granted or not, in accordance with an authentication result by the authentication step and the response time measured by the measurement step.

A program of a first recording medium of the present invention is characterized by having: a command transmission control step of controlling, after authentication data is generated in accordance with shared data shared with a receiving apparatus, transmission of a command for requesting for a response to the receiving apparatus; an authentication control step of controlling authentication of the receiving apparatus in accordance with an expected value generated based upon the shared data and the authentication data generated at the receiving apparatus; a measurement control step of controlling measurement a response time taken by the receiving apparatus to respond to the command; and a judgment control step of controlling judgment whether data transmission to the receiving apparatus is granted or not, in accordance with an authentication result by the authentication control step and the response time measured by the measurement control step.

A first program of the present invention makes a computer execute a process, the process characterized by having: a command transmission control step of controlling, after authentication data is generated in accordance with shared data shared with a receiving apparatus, transmission of a command for requesting for a response to the receiving apparatus; an authentication control step of controlling authentication of the receiving apparatus in accordance with an expected value generated based upon the shared data and the authentication data generated at the receiving apparatus; a measurement control step of controlling measurement a response time taken by the receiving apparatus to respond to the command; and a judgment control step of controlling judgment whether data transmission to the receiving apparatus is granted or not, in accordance with an authentication result by the authentication control step and the response time measured by the measurement control step.

In the first information processing apparatus and method of the present invention, and program of the present invention, after the authentication data is generated in accordance with the shared data shared with the receiving apparatus, the command for requesting for the response is transmitted to the receiving apparatus, the receiving apparatus is authenticated in accordance with the expected value generated based upon the shared data and the authentication data generated at the receiving apparatus, the response time taken by the receiving apparatus to respond to the command is measured, and whether data transmission to the receiving apparatus is granted or not is judged in accordance with the authentication result and the response time.

A second information processing apparatus of the present invention capable of communicating with a transmitting apparatus which judges whether data transmission is granted or not, in accordance with an authentication result based on authentication data generated from shared data shared with the transmitting apparatus and a response time to a predetermined command from the transmitting apparatus, is characterized by having: authentication data generation means for generating the authentication data by subjecting the shared data to a predetermined process, before the command is transmitted from the transmitting apparatus; response message generation means for generating a response message to the command before the command is transmitted from the transmitting apparatus, the response message including the authentication data generated by the authentication data generation means; and transmission means for transmitting the response message to the transmitting apparatus when the command transmitted from the transmitting apparatus is received.

The shared data may be a quasi random number, the quasi random number may be transmitted from the transmitting apparatus before the command is transmitted, the authentication data generation means may subject the quasi random number to a Keyed-Hash process and a resultant Hash value may be used as the authentication data.

The authentication data generation means may execute a Keyed-Hash process relative to the quasi random number and information specific to the information processing apparatus and may use a resultant Hash value as the authentication data.

If the command is transmitted from the transmitting apparatus a maximum of N times to judge whether data transmission is granted or not, the authentication data generation means may execute the process relative to the shared data before a first one of the command is transmitted from the transmitting apparatus and generates N sets of the authentication data corresponding to N sets of the command to be transmitted.

The transmission means may transmit the response message generated by the response message generation means to the transmitting apparatus in such a manner that N sets of the authentication data are supplied to the transmitting apparatus in a sequence agreed beforehand with the transmitting apparatus.

The authentication data generation means may divide the data obtained by subjecting the shared data to the process into a plurality of data pieces and may generate N sets of the authentication data from the divides data.

The authentication data generation means may generate N sets of the authentication data from data obtained at each process of repetitively executing the process relative to the shared data.

When the command from the transmitting apparatus is received, the transmission means may transmit a response message to the transmitting apparatus, the response message containing new authentication data generated from the authentication data and information contained in the command.

A second information processing method of the present invention is characterized by having: an authentication data generation step of generating the authentication data by subjecting the shared data to a predetermined process, before the command is transmitted from the transmitting apparatus; a response message generation step of generating a response message to the command before the command is transmitted from the transmitting apparatus, the response message including the authentication data generated by a process at the authentication data generation step; and a transmission step of transmitting the response message to the transmitting apparatus when the command transmitted from the transmitting apparatus is received.

A program of a second recording medium of the present invention is characterized by having: an authentication data generation control step of controlling generation of the authentication data by subjecting the shared data to a predetermined process, before the command is transmitted from the transmitting apparatus; a response message generation control step of controlling generation of a response message to the command before the command is transmitted from the transmitting apparatus, the response message including the authentication data generated by a process at the authentication data generation step; and a transmission control step of controlling transmission of the response message to the transmitting apparatus when the command transmitted from the transmitting apparatus is received.

A second program of the present invention is characterized by having: an authentication data generation control step of controlling generation of the authentication data by subjecting the shared data to a predetermined process, before the command is transmitted from the transmitting apparatus; a response message generation control step of controlling generation of a response message to the command before the command is transmitted from the transmitting apparatus, the response message including the authentication data generated by a process at the authentication data generation step; and a transmission control step of controlling transmission of the response message to the transmitting apparatus when the command transmitted from the transmitting apparatus is received.

In the second information processing apparatus and method of the present invention, and program of the present invention, the authentication data is generated by executing the predetermined process relative to the shared data before the command is transmitted from the transmitting apparatus, the response message to the command is generated before the command is transmitted from the transmitting apparatus, the response message including the generated authentication data, and the response message is transmitted to the transmitting apparatus when the command transmitted from the transmitting apparatus is received.

A third information processing apparatus of the present invention is characterized by having: authentication data generation means for generating command authentication data and response expected value data from shared data shared with a receiving apparatus; command transmission means for transmitting a command for requesting for a response to the receiving apparatus, the command containing the command authentication data; response reception means for receiving a response to the command from the receiving apparatus; authentication means for authenticating the receiving apparatus in accordance with the response expected value and the response authentication data contained in the response received from the receiving apparatus; measurement means for measuring a response time taken by the receiving apparatus to respond to the command; and judgment means for judging whether data transmission to the receiving apparatus is granted or not, in accordance with an authentication result by the authentication means and the response time measured by the measurement means.

The command transmission means may transmit the command a maximum of k times to judge whether data transmission is granted or not, and the authentication means may authenticate the receiving apparatus in accordance with the authentication data corresponding to a transmission sequence of the command and a corresponding one of the expected value.

A third information processing method of the present invention is characterized by having: an authentication data generation step of generating command authentication data and response expected value data from shared data shared with a receiving apparatus; a command transmission step of transmitting a command for requesting for a response to the receiving apparatus, the command containing the command authentication data; a response reception step of receiving a response to the command from the receiving apparatus; an authentication step of authenticating the receiving apparatus in accordance with the response expected value and the response authentication data contained in the response received from the receiving apparatus; a measurement step of measuring a response time taken by the receiving apparatus to respond to the command; and a judgment step of judging whether data transmission to the receiving apparatus is granted or not, in accordance with an authentication result by the authentication step and the response time measured by the measurement step.

A program of a third recording medium of the present invention is characterized by having: an authentication data generation step of generating command authentication data and response expected value data from shared data shared with a receiving apparatus; a command transmission step of transmitting a command for requesting for a response to the receiving apparatus, the command containing the command authentication data; a response reception step of receiving a response to the command from the receiving apparatus; an authentication step of authenticating the receiving apparatus in accordance with the response expected value and the response authentication data contained in the response received from the receiving apparatus; a measurement step of measuring a response time taken by the receiving apparatus to respond to the command; and a judgment step of judging whether data transmission to the receiving apparatus is granted or not, in accordance with an authentication result by the authentication step and the response time measured by the measurement step.

A third program of the present invention makes a computer execute a process, the process characterized by having: an authentication data generation step of generating command authentication data and response expected value data from shared data shared with a receiving apparatus; a command transmission step of transmitting a command for requesting for a response to the receiving apparatus, the command containing the command authentication data; a response reception step of receiving a response to the command from the receiving apparatus; an authentication step of authenticating the receiving apparatus in accordance with the response expected value and the response authentication data contained in the response received from the receiving apparatus; a measurement step of measuring a response time taken by the receiving apparatus to respond to the command; and a judgment step of judging whether data transmission to the receiving apparatus is granted or not, in accordance with an authentication result by the authentication step and the response time measured by the measurement step.

In the third information processing apparatus and method of the present invention, and program of the present invention, the command authentication data and expected value data are generated from the data shared with the receiving apparatus, the command requesting for the response is transmitted to the receiving apparatus, the command including the command authentication data, the response to the command from the receiving apparatus is received, the receiving apparatus is authenticated in accordance with the response expected value and the response authentication data contained in the response received from the receiving apparatus, the response time taken by the receiving apparatus to respond to the command is measured, and it is judged whether the data transmission to the receiving apparatus is granted or not, in accordance with the authentication result and response time.

A fourth information processing apparatus of the present invention is characterized by having: generation means for generating, from shared data shared with the transmitting apparatus, command expected value data and response authentication data respectively corresponding to authentication data of the command generated at the transmitting apparatus from the shared data; authentication means for authenticating the transmitting apparatus in accordance with authentication data of the command contained in the command and the command expected value data generated by the generation means, when the command transmitted from the transmitting apparatus is received; and transmission means for transmitting a response containing the response authentication data to the transmitting apparatus, in accordance with an authentication result by the authentication means.

A fourth information processing method of the present invention is characterized by having: a generation step of generating, from shared data shared with the transmitting apparatus, command expected value data and response authentication data respectively corresponding to authentication data of the command generated at the transmitting apparatus from the shared data; an authentication step of authenticating the transmitting apparatus in accordance with authentication data of the command contained in the command and the command expected value data generated by a process of the generation step, when the command transmitted from the transmitting apparatus is received; and a transmission step of transmitting a response containing the response authentication data to the transmitting apparatus, in accordance with an authentication result by a process of the authentication step.

A program of a fourth recording medium of the present invention is characterized by having: a generation step of generating, from shared data shared with the transmitting apparatus, command expected value data and response authentication data respectively corresponding to authentication data of the command generated at the transmitting apparatus from the shared data; an authentication step of authenticating the transmitting apparatus in accordance with authentication data of the command contained in the command and the command expected value data generated by a process of the generation step, when the command transmitted from the transmitting apparatus is received; and a transmission step of transmitting a response containing the response authentication data to the transmitting apparatus, in accordance with an authentication result by a process of the authentication step.

A forth program of the present invention makes a computer execute a process, the process characterized by having: a generation step of generating, from shared data shared with the transmitting apparatus, command expected value data and response authentication data respectively corresponding to authentication data of the command generated at the transmitting apparatus from the shared data; an authentication step of authenticating the transmitting apparatus in accordance with authentication data of the command contained in the command and the command expected value data generated by a process of the generation step, when the command transmitted from the transmitting apparatus is received; and a transmission step of transmitting a response containing the response authentication data to the transmitting apparatus, in accordance with an authentication result by a process of the authentication step.

In the fourth information processing apparatus and method of the present invention, and program of the present invention, from the shared data shared with the transmitting apparatus, the command expected value data and response authentication data respectively corresponding to the authentication data of the command generated at the transmitting apparatus from the shared data are generated, the transmitting apparatus is authenticated in accordance with the command authentication data contained in the command and the generated command expected value data when the command transmitted from the transmitting apparatus is received, and the response containing the response authentication data is transmitted to the transmitting apparatus in accordance with the authentication result.

BEST MODES FOR CARRYING OUT THE INVENTION

Figure 1:
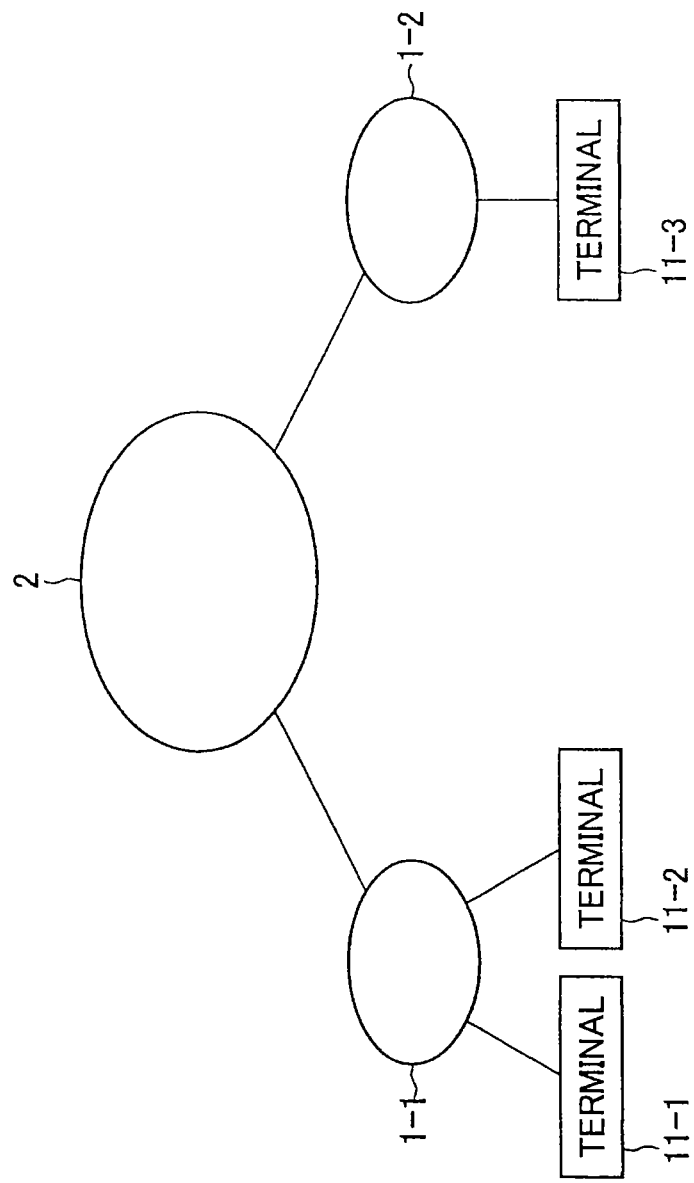
FIG. 1 is a diagram showing an application example of an information communication system adopting the present invention.

FIG. 1 shows an example of the structure of an information communication system constituted of terminals 11, adopting the present invention.

Lans 1-1 and 1-2 (if it is not necessary to discriminate between Lans, simply called LAN 1. This is also applied to other cases) are mutually connected via a WAN 2.

LAN 1-1 is installed, for example, in a house and has an approximate size allowing particular individuals (or family) to use it. To this end, LAN 1-1 is connected to the terminals 11-1 and 11-2 such as personal computers and AV apparatuses via switching hubs (not shown). Connection between LAN 1-1 and the terminals 11-1 and 11-2 is established by a high speed interface such as Ethernet (registered trademark) (100BASE-TX). The terminals 11-1 and 11-2 can be connected to LAN 1-2 via WAN 2.

LAN 1-2 is configured in a manner similar to LAN 1-1 and a terminal 11-3 is connected thereto.

Figure 2:
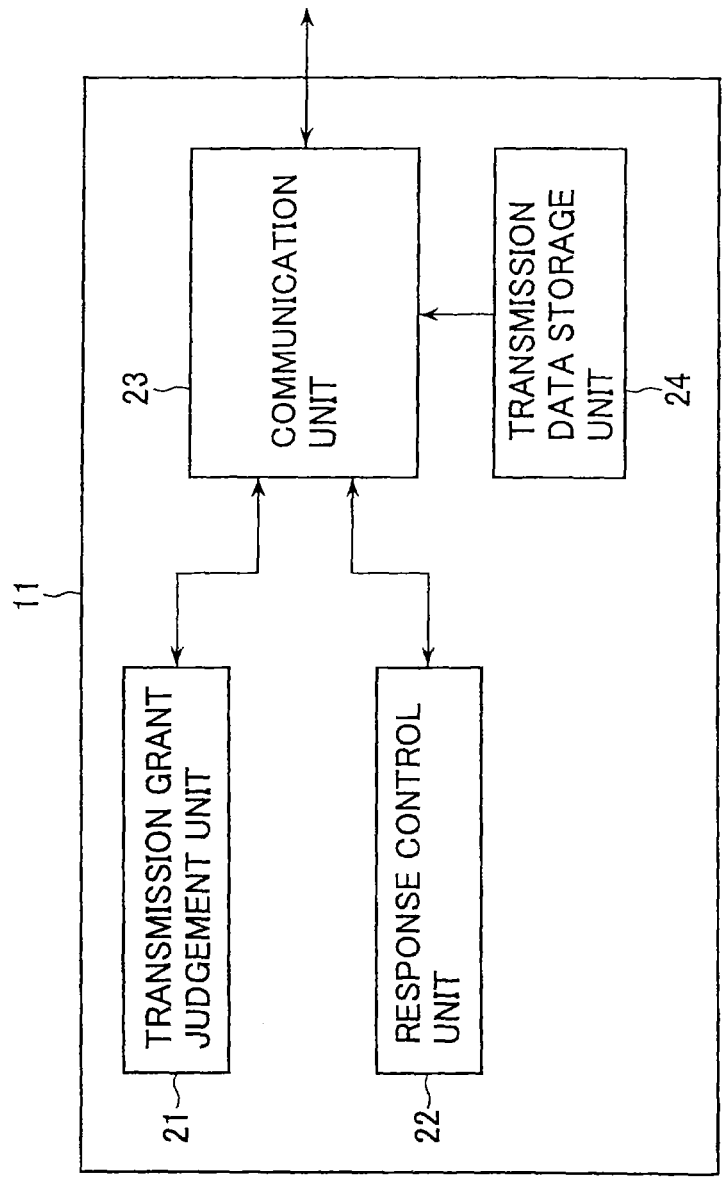
FIG. 2 is a block diagram showing an example of the structure of a terminal shown in FIG. 1.

Each terminal 11 is an authorized apparatus registered in this information communication system, and as shown in FIG. 2, is constituted of a transmission grant judgment unit 21, a response control unit 22, a communication unit 23 and a transmission data storage unit 24.

When predetermined data is transmitted to another terminal 11 (terminal 11 on a reception side), the transmission grant judgment unit 21 communicates with the reception side terminal 11 (more correctly, the reception side respond control unit 22) via the communication unit 23 in a manner to be described later, authenticates whether the reception side terminal 11 is an authorized apparatus of the information communication system, and measures a response time of the reception side terminal 11 to a predetermined request, as a communication time with the reception side terminal 11.

In accordance with a communication distance judgment result based on the authentication result and response time of the reception side terminal 11, the transmission grant judgment unit 21 judges whether data transmission to the reception side terminal 11 is granted or not.

For example, if the reception terminal 11 is connected to LAN 1 different from LAN 1 of the transmission side terminal 11 (a so-called long communication distance case through connection via WAN 2), a response time becomes longer than if the reception terminal 11 is connected to the same LAN 1 (a short communication distance). Therefore, for example, if the communication is restricted in the same LAN 1, the transmission grant judgment unit 21 judges from the measured response time whether the reception side terminal 11 is connected to the same LAN 1 as that of the transmission side terminal 11, and judges, from this judgment result and the authentication result of the reception side terminal 11, whether data transmission can be granted.

More specifically, in the example shown in FIG. 1, when the terminal 11-1 (on the transmission side) transmits data to the terminal 11-2 (on the reception side), the transmission grant judgment unit 21 of the terminal 11-1 judges from the measured response time of the terminal 11-2 that the terminal 11-2 is connected to LAN 1-1 to execute data transmission. On the other hand, when the terminal 11-1 transmits data to the terminal 11-3, the transmission grant judgment unit 21 of the terminal 11-1 judges from the measured response time of the terminal 11-3 that the terminal 11-3 is connected to LAN (LAN 1-2) different from LAN 1-1 not to execute data transmission.

This communication control by a communication distance is applicable to content distribution businesses, for example, the content of movie or the like is distributed first to a predetermined district, and on later days to another district.

Reverting to FIG. 2, when the predetermined data is received from the transmission side terminal 11, the response control unit 22 communicates with the transmission side terminal 11 (more correctly, the transmission side transmission grant judgment unit 21) in a manner to be described later, and transmits to the transmission side terminal information necessary for the authentication at the transmission side terminal 11 and for proper response time measurement, respectively via the communication unit 23.

The communication unit 23 is connected to LAN 1 and communicates with the terminal 11 in the same LAN 1 or the terminal 11 connected to a different LAN 1 via WAN 2.

The transmission data storage unit 24 stores predetermined data to be transmitted to the reception side terminal 11.

Figure 3:
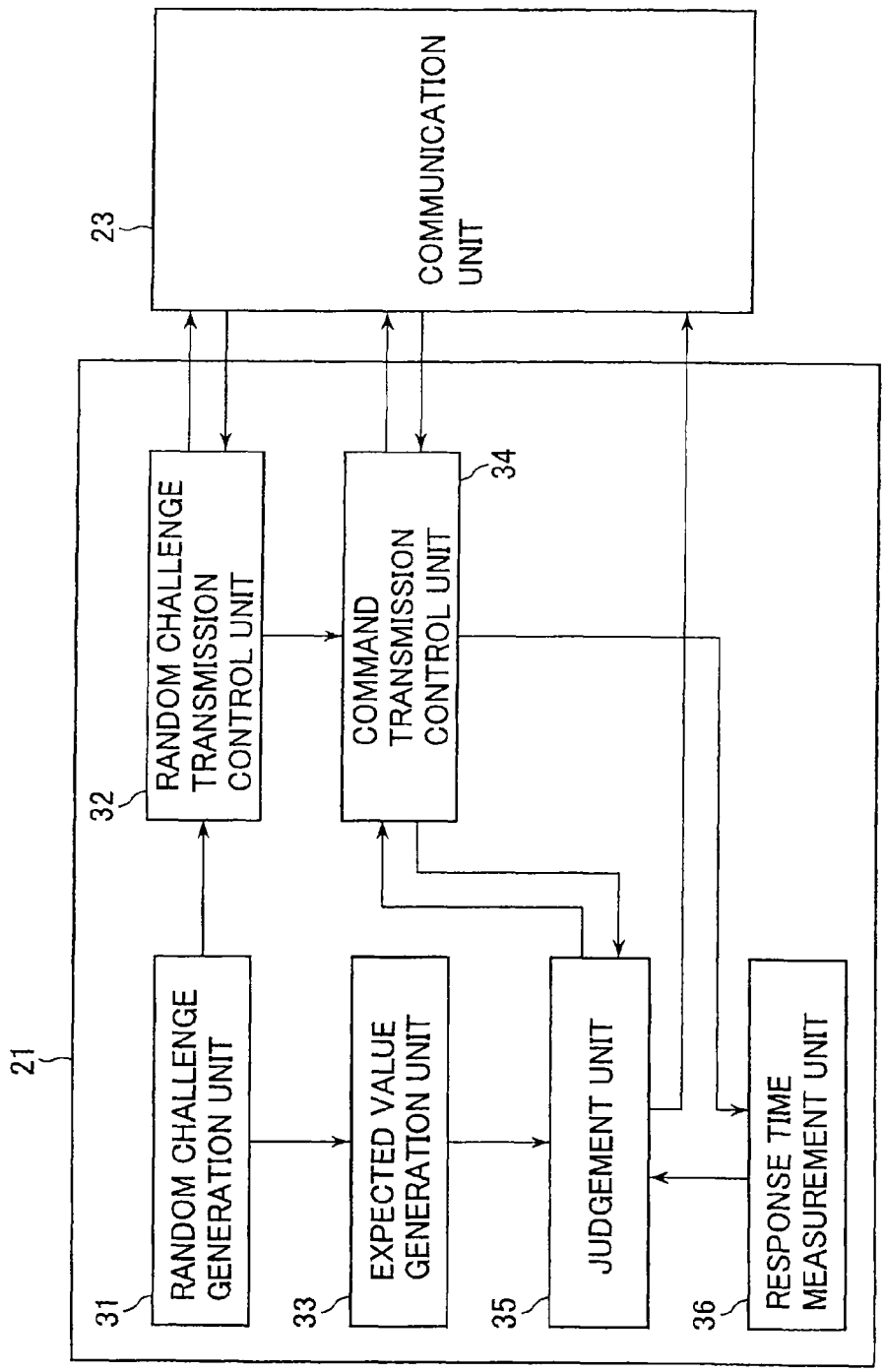
FIG. 3 is a block diagram showing an example of the structure of a transmission grant judgment unit shown in FIG. 2.

FIG. 3 shows an example of the structure of the transmission grant judgment unit 21 of the terminal 11.

A random challenge generation unit 31 generates a quasi random number (hereinafter called a random challenge) having a predetermined number of bits, and supplies it to a random challenge transmission control unit 32 and an expected value generation unit 33.

The random challenge transmission control unit 32 transmits the random challenge supplied from the random challenge generation unit 31, to the reception terminal 11 via the communication unit 23. The random challenge transmission control unit 32 also receives a message (hereinafter called an RC reception message) to the effect that the random challenge is received, the RC reception message being transmitted from the reception side terminal 11, and notifies a command transmission control unit 34 of the reception of the RC reception message, respectively via the communication unit 23.

An expected value generation unit 33 makes the random challenge supplied from the random challenge generation unit 31 be subjected to, for example, a Hash process (so-called Keyed-Hash process) based on an HMAC algorithm (Keyed Hashing for Message Authentication, IETF RFC 2104) using a secret key shared with the reception side terminal 11, generates an expected value of authentication data to be generated from the random challenge by the reception side terminal 11, and supplies it to a judgment unit 35. The expected value generation unit 33 may generate an expected value by executing the Keyed-Hash process relative to the random challenge information coupled to information (e.g., apparatus ID) which is specific to the terminal 11 and preset to the terminal 11.

The secret key used by the Hash process is distributed to each authorized apparatus of the information communication system at a predetermined timing in secret.

When the reception of the RC reception message is notified from the random transmission control unit 32, the command transmission control unit 34 transmits a command requesting for a response (hereinafter called a response request command) to the reception side terminal 11 via the communication unit 23, in accordance with an instruction from a judgment unit 35.

The command transmission control unit 34 receives a message (hereinafter called a response message) transmitted from the reception side terminal 11 as a response to the transmitted response request command, and supplies it to the judgment unit 35, respectively via the communication unit 23. The response message has built-in authentication data generated from the random challenge transmitted from the random challenge transmission control unit 32.

After the response request command is transmitted, the command transmission control unit 34 controls a response time measurement unit 36 to start measuring a response time, and to terminate measuring the response time when the response message as a response to the response request command is received.

In accordance with the authentication data built in the response message from the command transmission control unit 34 and the expected value of the authentication data generated by the expected value generation unit 33, the judgment unit 35 authenticates whether the reception side terminal 11 is an authorized apparatus of the information communication system. The judgment unit 35 also judges whether the response time measured by the response time measurement unit 36 is longer than a predetermined time TL and judges the communication distance (judges whether the reception side terminal is connected to the same LAN 1 as that of the transmission side terminal 11)

In accordance with the authentication result of the reception side terminal 11 and the judgment result of the communication distance, the judgment unit 35 judges whether data transmission is granted or not. In accordance with this judgment, the judgment unit 35 controls the communication unit 23 to transmit the data stored in the transmission data storage unit 24 to the reception side terminal 11.

In accordance with an instruction from the command transmission control unit 34, the response time measurement unit 36 activates a built-in timer to measure the response time of the reception side terminal 11.

Figure 4:
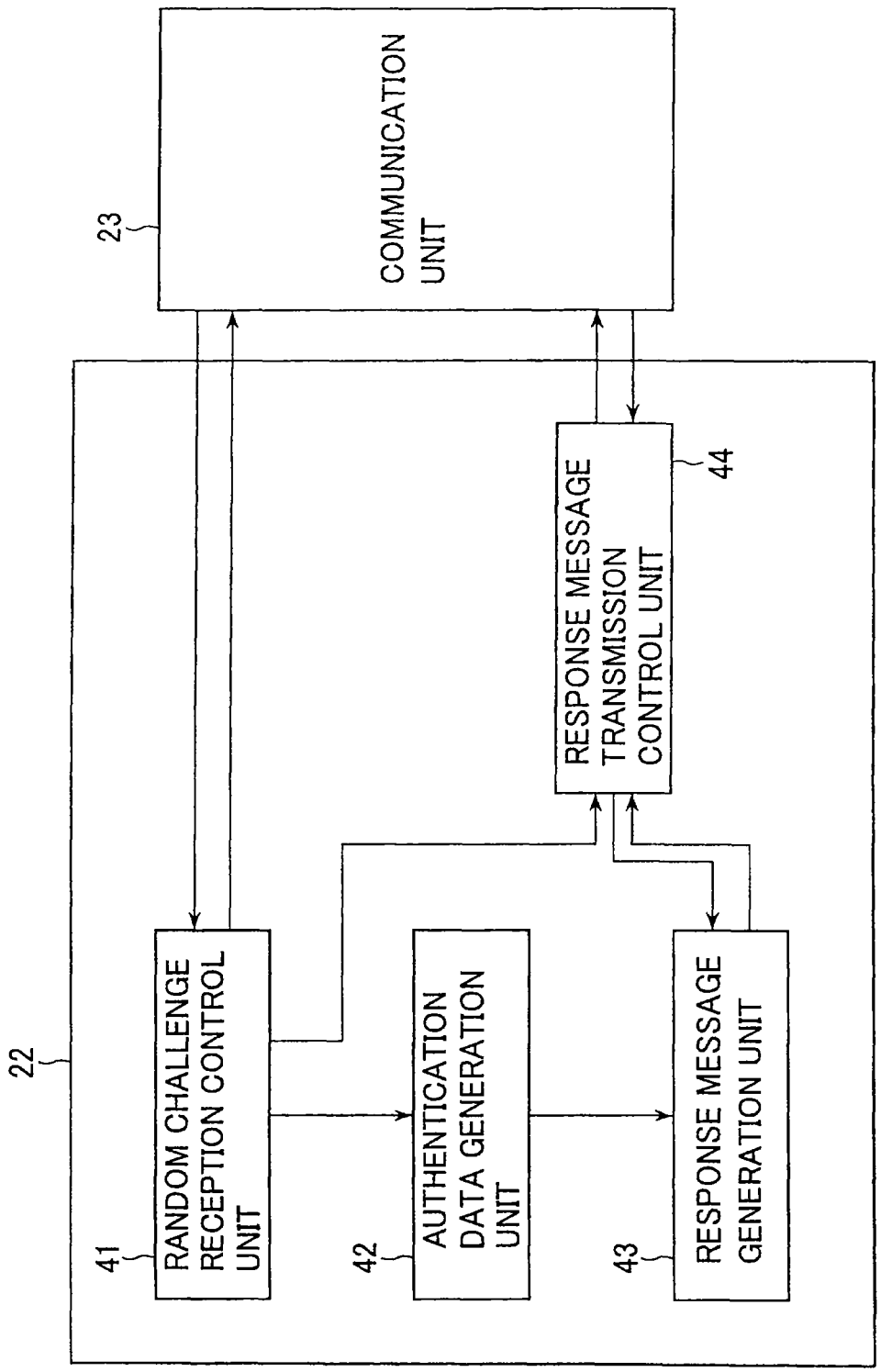
FIG. 4 is a block diagram showing an example of the structure of a response control unit shown in FIG. 2.

FIG. 4 shows an example of the structure of the response control unit 22 of the terminal 11.

A random challenge reception control unit 41 receives via the communication unit 23 the random challenge transmitted from the transmission side terminal 11 (more correctly, the transmission side transmission grant judgment unit 21) and supplies it to the authentication data generation unit 42). The random challenge reception control unit 41 also transmits via the communication unit 23 the RC reception message (message to the effect that the random challenge is received) to the transmission side terminal 11, and notifies a reception message transmission control unit 44 of the transmission of the RC reception massage.

An authentication data generation unit 42 makes the random challenge supplied from the random challenge reception control unit 41 be subjected to a Keyed-Hash process in a manner similar to the case of the transmission side terminal 11 (the expected value generation unit 33 of the transmission grant judgment unit 21) to generate authentication data which the third party cannot be estimated, and supply it to a response message generation unit 43.

Under the control of the response message transmission control unit 44, the response message generation unit 43 generates the response message assembled with the authentication data supplied from the authentication data generation unit 42, and supplies it to the response message transmission control unit 44.

The response message transmission control unit 44 receives via the communication unit 23 the response request command transmitted from the transmission side terminal 11.

The response message transmission control unit 44 controls the response message generation unit 43 at the timing before the response request command is received (at the timing before the response request command is transmitted from the transmission side terminal 11) to make it generate the response message assembled with the authentication data corresponding to the response request command to be received. When the response request command is received, the response message is transmitted to the transmission side terminal 11 via the communication unit 23.

Next, with reference to the flow chart of FIG. 5, description will be made on the operation of the transmission grant judgment unit 21 (FIGS. 2 and 3) of the terminal 11 executing the transmission grant judgment process.

At Step S1 the random challenge generation unit 31 of the transmission grant judgment unit 21 of the terminal 11 (transmission side terminal 11) generates the random challenge and supplies it to the random challenge transmission control unit 32 and expected value generation unit 33.

At Step S2, the random challenge transmission control unit 32 transmits the supplied random challenge to the reception side terminal 11 via the communication unit 23, and at Step S3, the expected value generation unit 33 executes the Keyed-Hash process relative to the supplied random challenge to generate the expected value of the authentication data to be generated at the reception side terminal 11.

In this example, since the transmission side terminal 11 transmits a maximum of N (=1, 2, . . . ) response request commands in sequence to judge a data transmission grant, N expected values of the authentication data are generated in correspondence to the N response request commands to be transmitted.

The N expected values can be generated by dividing the data obtained as the result of the Keyed-Hash process for the random challenge and using the divided data sets. In the example shown in FIG. 6, the data obtained as the result of the Keyed-Hash process for the random challenge is divided into N sets and N expected values, from an expected value 1 to an expected value N, are obtained.

Figure 7:
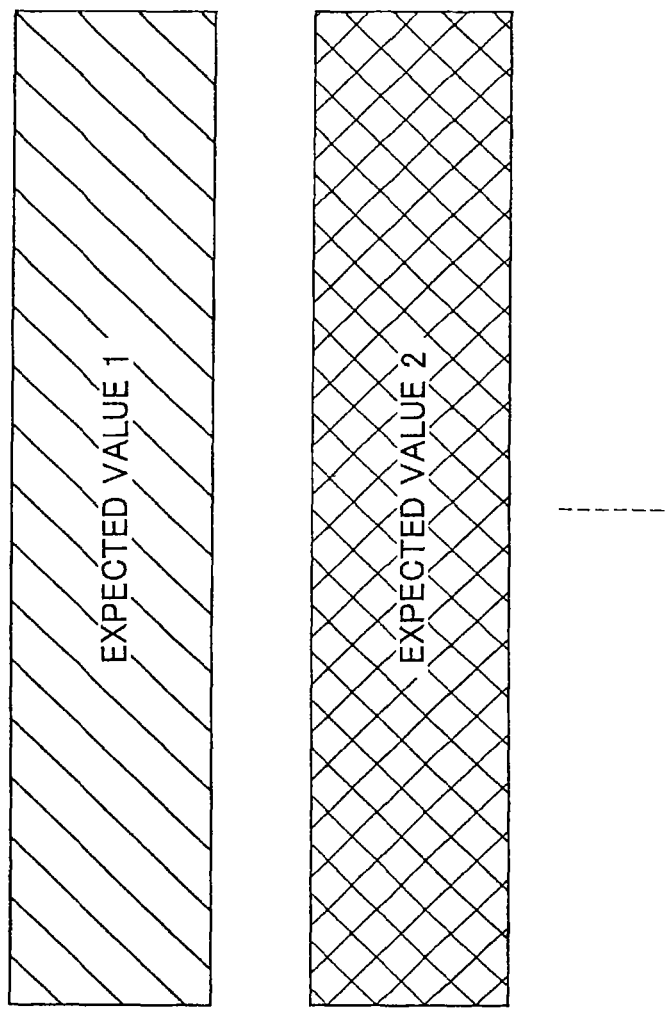
FIG. 7 is a diagram illustrating another method of generating an expected value and authentication data.

The Keyed-Hash process for the random challenge may be executed a plurality of times to generate N expected values from the data obtained at each process. In the example shown in FIG. 7, the Keyed-Hash process for the random challenge is executed N times and N data sets obtained at the respective processes are used as the expected values. An expected value 1 shown in FIG. 7 is obtained as a result of executing once the Keyed-Hash process for the random challenge, and an expected value 2 is obtained as a result of the Keyed-Hash process for the expected value 1.

Reverting to FIG. 5, at Step S4 the random challenge transmission control unit 32 receives via the communication unit 23 the RC reception message (Step S23) to the effect that the random challenge transmitted at Step S2 from the reception side terminal 11 to be described later is received, and notifies the command transmission control unit 34 of this reception. At Step S5 the command transmission control unit 34 initializes a counter i to 1, the counter i indicating the sequence of the response request command to be transmitted (transmission sequence).

Next, at Step S6 the command transmission control unit 34 transmits the response request command to the reception side terminal 11 via the communication unit 23, and at Step S7 controls the response time measurement unit 36 to start measuring the response time.

At Step S8 the command transmission control unit 34 receives via the communication unit 23 the response message to the response request command transmitted at step S6 from the reception side terminal 11 to be described later, supplies it to the judgment unit 35, and at Step S9 controls the response time measurement unit 36 to terminate the measurement of the response time. Namely, the time obtained by a measurement starting at Step S7 and terminating at S9 is the response time of the reception side terminal 11.

At Step S10 the judgment unit 35 judges whether the authentication data assembled in the reception message supplied from the command transmission control unit 34 matches with the expected value (specifically, the expected value corresponding to the response request command transmitted at the sequence indicated by the counter i (hereinafter called a response request command transmitted at the i-th sequence)) of the corresponding authentication data generated by the expected value generation unit 33. If it is judged to match, the reception side terminal 11 is authenticated as an authorized terminal of the information communication system, to thereafter advance to Step S11.

At Step S11 the judgment unit 35 judges whether the response time of the reception side terminal 11, measured by the response time measurement unit 3, relative to the response request command transmitted at the i-th sequence, is longer than the predetermined time TL. The time TL is, for example, a communication time taken to communicate between terminals connected to the same LAN 1. Namely, if the response time is longer than the time TL, it can be judged that the reception side terminal 11 is connected to LAN 1 different from that of the transmission side terminal 11, whereas if the response time is not longer than the time TL (including response time=time TL), it is can be judged that the reception side terminal 11 is not connected to the same LAN 1 (the communication distance can be judged).

If it is judged at Step S11 that the response time is longer than the time TL, the flow advances to Step S12 whereat the judgment unit 35 notifies the judgment result to the command transmission control unit 34 which in turn increments the counter i by 1.

At Step S13 the command transmission control unit 34 judges whether the counter i is N+1. If it is judged that the counter i is not N+1, the flow returns to Step S6 after a lapse of a predetermined time. If it is judged at Step S13 that the counter i is N+1 (namely, if the response request command was transmitted N times), or it is judged at Step S10 that the reception side terminal 11 is not an authorized apparatus of the information communication system, then the flow advances to Step S14 whereat this effect is notified to the judgment unit 3. Then, the judgment unit 35 rejects the data transmission to the reception side terminal 11 and controls the communication unit 23 to reject the transmission of the data stored in the transmission data storage unit 24 to the reception side terminal 11.

If it is judged at Step S11 that the response time to the response request command transmitted at the i-th sequence is not longer than the time TL, i.e., if the reception side terminal 11 is the authorized apparatus of the information communication system and the reception side terminal 11 is connected to, e.g., the same LAN 1 as that of the transmission side terminal 11, then the flow advances to Step S15 whereat the judgment unit 35 controls the communication unit 23 to transmit the data stored in the transmission data storage unit 24 to the reception side terminal 11.

After whether the data transmission to the reception side terminal 11 is granted or not is judged at Step S14 or Step S15, the judgment unit 35 transmits via the communication unit 23 a message (hereinafter called a judgment completion message) to the effect that the transmission grant judgment is completed, to the reception side terminal 11. The transmission grant judgment process is thereafter terminated.

Next, with reference to the flow chart of FIG. 5, description will be made on the operation of the response control unit 22 (FIGS. 2 and 4) of the terminal 11 executing the response process.

At Step S21 the random challenge reception control unit 41 of the response control unit 22 of the terminal 11 (the reception side terminal 1) receives via the communication unit 23 the random challenge transmitted from the transmission destination terminal 11 (at Step S2), and supplies it to the authentication data generation unit 42. At Step S22 the authentication data generation unit 42 makes the random challenge supplied from the random challenge reception control unit 41 be subjected to the Keyed-Hash process similar to the Keyed-Hash process (at Step S3) at the transmission grant judgment unit 21 (expected value generation unit 33) of the transmission side terminal 11, to generate the authentication data and transmit it to the response message generation unit 43.

Figure 6:
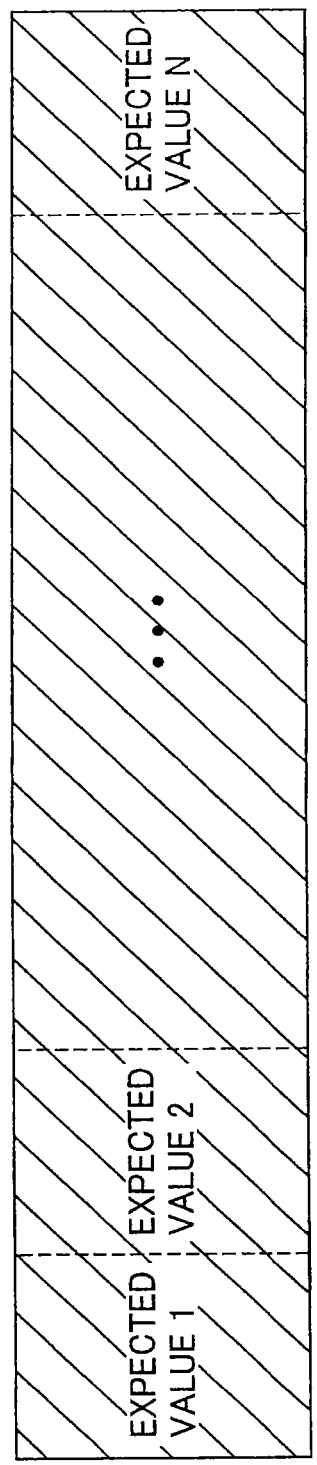
FIG. 6 is a diagram illustrating a method of generating an expected value and authentication data.

In this example, since N response request commands at a maximum can be received, N authentication data sets to be compared with the expected values corresponding to the response request commands (Step S10) are generated. N authentication data sets are generated by a method similar to the expected value generation method (FIGS. 6 and 7).

After the authentication data is generated in this manner, at Step S23 the random challenge reception control unit 41 transmits the RC reception message to the transmission side terminal 11 via the communication unit 23, and notifies this to the response message transmission control unit 44.

At Step S24, the response message transmission control unit 44 initializes a counter j to 1, the counter j indicating the sequence of the response request command to be received, and at Step S25 controls the response message generation unit 43 to generate the response message assembled with the authentication data corresponding to the response request command to be received in the sequence indicated by the counter j (hereinafter called a response request command received at the j-th sequence).

Next, at Step S26 the response message transmission control unit 44 receives via the communication unit 23 the response request command transmitted from the transmission destination terminal 11 (at Step S6), and at Step S27 transmits via the communication unit 23 the response message assembled with the authentication data corresponding to the response request command received at the j-th sequence to the transmission side terminal 11. In this manner, as described earlier, the transmission side terminal 11 compares (at Step S10) the authentication data corresponding to the response request command received at the j-th sequence (transmitted at the i-th sequence) with the expected value corresponding to the response request command transmitted at the i-th sequence (received at the j-th sequence).

At Step S28 the response message transmission control unit 44 of the response control unit 22 of the reception side 11 judges whether the judgment completion message transmitted from the transmission side terminal 11 (at Step S16) is received. If it is judged that the judgment completion message is not received in a predetermined time, the flow advances to Step S29 whereat the response message transmission control unit 44 increments the counter j by 1 and at Step S30 judges whether the counter j=N+1.

If it is judged at Step S30 that the counter j is not N+1 (i.e., if the response request command is not received N times), the flow returns to Step S25 to execute Step S25 and succeeding Steps for the response request command to be received next.

If the judgment completion message is received at Step S28 or if it is judged at Step S30 that the counter j is N+1 (i.e., if the response request command was received N times), then the response control unit 22 terminates the response process.

As described above, the communication distance judgment by the response time is executed only for the reception side terminal 11 authenticated in accordance with the authentication data generated from the random challenge (at Step S22) and the expected value (Step S3) (the process at Step S11 is skipped if the judgment at Step S10 is NO). Therefore, it is possible to prevent data from being transmitted to an apparatus which performs an identity theft of an authorized apparatus (data will not be transmitted to the apparatus which makes an identity theft of an authorized apparatus, receives the response request command and transmits the response request message).

The transmission side terminal 11 may assemble a newly generated random challenge in the response request command and transmit it to the reception side terminal 11 (Step S6). When the reception side terminal 11 receives the response request command (Step S26), the already generated authentication data (Step S22) is coupled to the random challenge assembled in the response request command or the logical calculation between them is performed, to generate new authentication data and return the response message assembled with the new authentication data (Step S27). In this case, the transmission side terminal 11 generates the expected value to be compared with the new authentication data at Step S10, by coupling the expected value generated at Step S3 to the random challenge assembled in the response request command or through the logical calculation therebetween.

By generating the authentication data and expected value from the random challenge assembled in the response request command as described above, the reception side terminal 11 cannot transmit the response massage until the response request command is received from the transmission side terminal 11. It is therefore possible to prevent an illegal act such as transmitting the response message before the response request command is received, in sequence to shorten the response time.

Further, since the authentication data and the response message assembled with the authentication data are generated before the response request command is received (Steps S22 and S25), the reception side terminal 11 can return the response message to the transmission side terminal 11 immediately after the response request command is received (Step S27).

For example, if the authentication data and the response request message are generated after the response request command is received, the time required for this process is contained in the response time measured at the transmission side terminal 11 so that the response time as the communication time cannot be measured correctly. However, by transmitting the response message immediately after the response request command is received as in this invention, the response time as the communication time can be measured correctly.

Furthermore, in the above description, although the transmission side terminal 11 generates the random challenge (Step S1) and provides it to the reception side terminal 11 (Step S2), the reception terminal may generate the random challenge and provide it to the transmission side 11.

Also in the above description, although the secret key is shared by the transmission side terminal 11 and the reception side terminal 11, if the secret key is not to be shared, it can be shared by using a Diffie-Hellman key exchange algorithm or the like. In this case, whether the partner with whom the key was exchanged can be confirmed based upon the certificate that the response time of the partner is measured, or the like. After the key exchange, the key itself acquired through the key exchange may be used as the authentication data and expected value, or the Keyed-Hash process is executed relative to a random number by using the exchanged key, as described previously, to obtain the authentication data and expected value.

In the above description, the reception side terminal 11 is authenticated (Step S10) based upon the authentication data of the response generated at the reception side terminal 11 (hereinafter called authentication data RR) (Step S22) and the expected value for the response generated at the transmission side terminal 11 (hereinafter called an expected value QR) (Step S3). The reception side terminal 11 may authenticate the transmission side terminal 11 in accordance with authentication data for the response request command from the transmission side terminal 11 (hereinafter called authentication data RS) and its expected value (hereinafter called an expected value QS).

Figure 5:
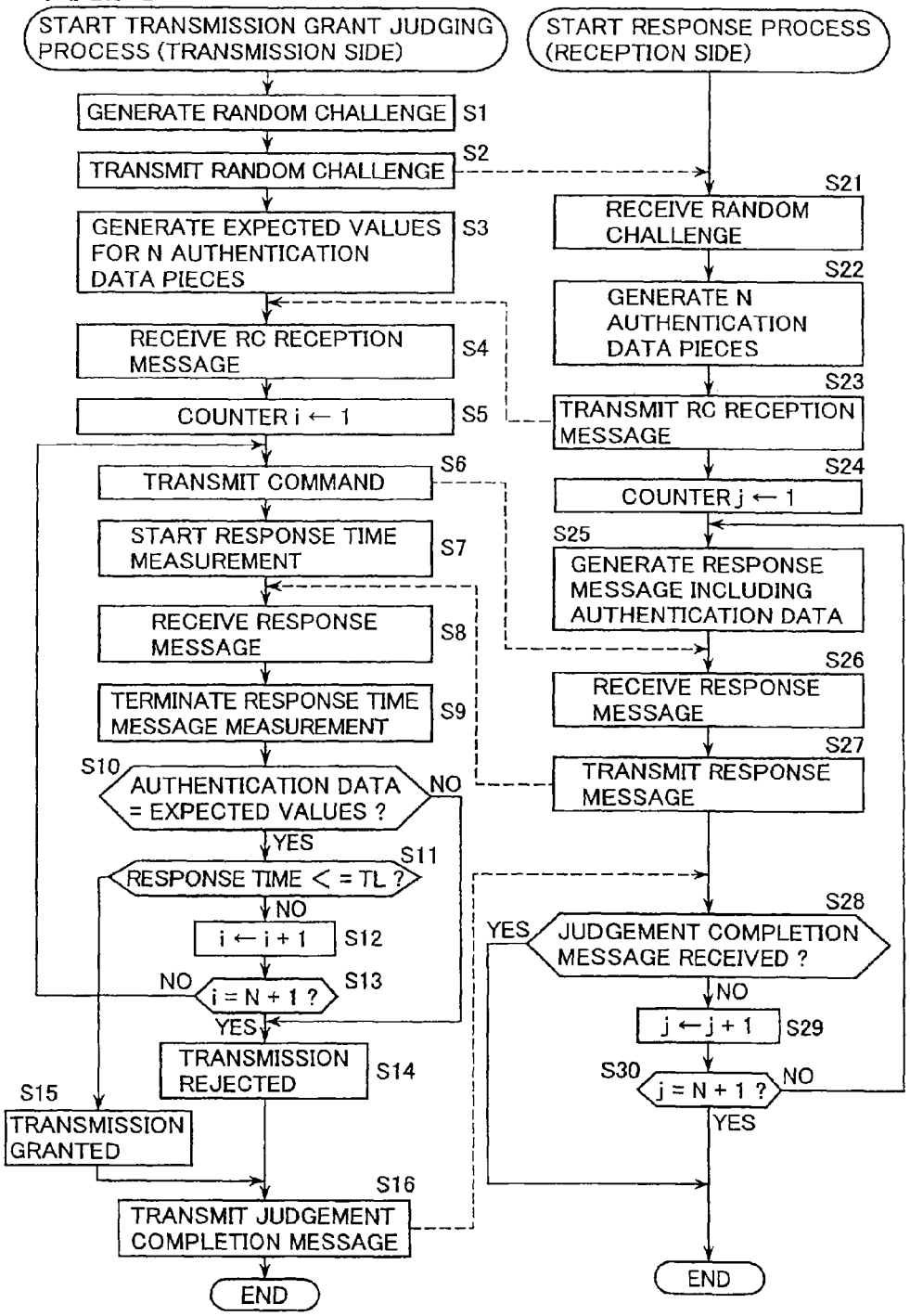
FIG. 5 is a flow chart illustrating a transmission grant judgment process and a response process.
Figure 8:
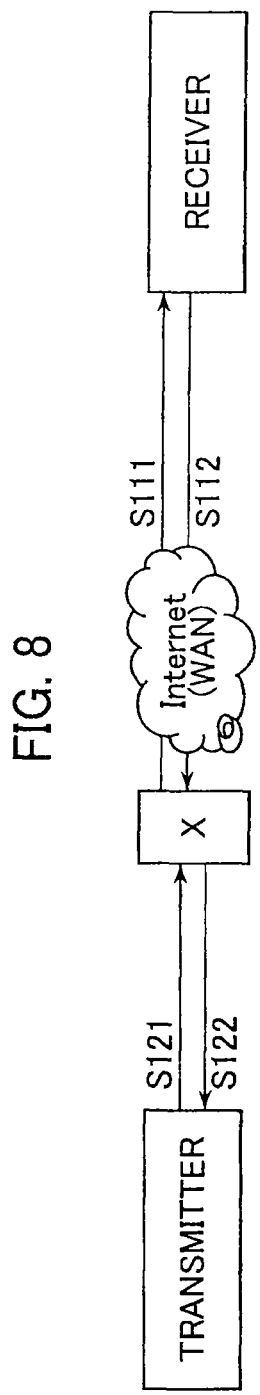
FIG. 8 is a diagram illustrating the operation of the terminal shown in FIG. 1.

In the example shown in FIG. 5, since the reception side terminal 11 returns the response message (Step S27) immediately after the response request command is received (S27), for example, as shown in FIG. 8 a third apparatus x is inserted into the same LAN 1 as that of the transmission side terminal 11 (transmitter), the apparatus x first sends the response request command to a receiving apparatus (S111) to acquire the response message from the receiving apparatus (S112), and when the response request command incomes from the transmitter (S121), the acquired response message is returned (S122). In this manner, the apparatus x can become an authorized apparatus through identity theft.

The illegal act of this type can be prevented by making also the reception side terminal 11 authenticate the transmission side terminal 11 when the response message is returned (it is possible to prevent the response message from being returned to the unauthorized apparatus).

Figure 9:
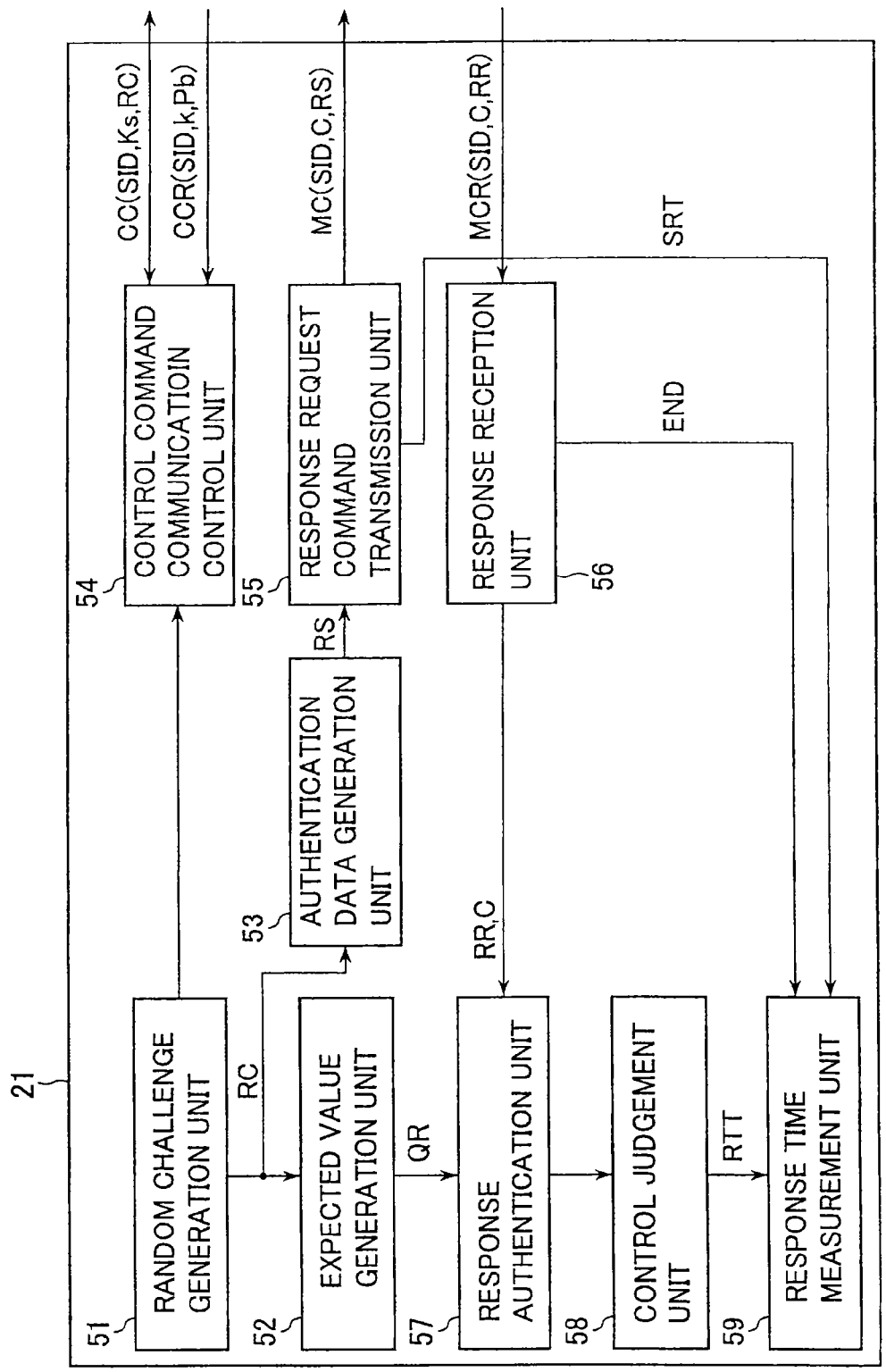
FIG. 9 is a block diagram showing another example of the structure of the transmission grant judgment unit shown in FIG. 2.
Figure 10:
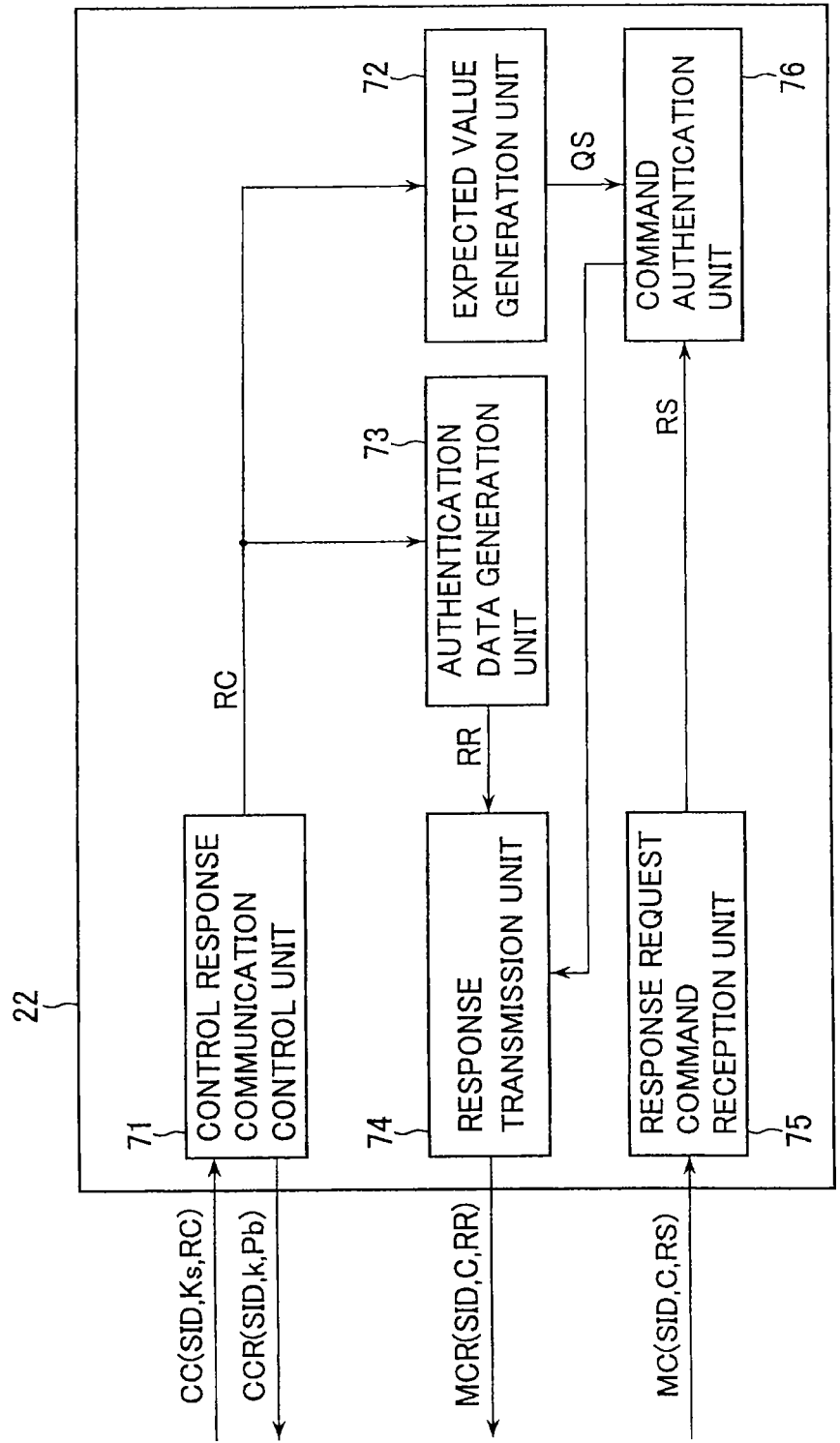
FIG. 10 is a block diagram showing another example of the structure of the response control unit shown in FIG. 2.

FIG. 9 shows an example of the structure of the transmission grant judgment unit 21 and FIG. 10 shows an example of the structure of the response control unit 22, respectively for when the reception terminal 11 authenticates the transmission terminal 11.

Similar to the random challenge generation unit 31 shown in FIG. 3, a random challenge generation unit 51 of the transmission grant judgment unit 21 generates a quasi random number having a predetermined number of bits, as the random challenge RC, and supplies it to an expected value generation unit 52 and an authentication data generation unit 53.

An expected value generation unit 52 makes the random challenge supplied from the random challenge generation unit 51 be subjected to, for example, a Keyed-Hash process similar to the case of a reception side terminal 11 (authentication data generation unit 73), by using the secret key shared with the reception terminal 11, generates the expected value QR for the authentication data RR of the reception side terminal 11 (the expected value QR having the same value as the corresponding authentication data RR), and supplies it to a response authentication unit 57.

The authentication data generation unit 53 makes the random challenge RC supplied from the random challenge generation unit 51 be subjected to the Keyed-Hash process using the secret key shared by the reception side terminal 11, generates the authentication data RS for the command which cannot be estimated by the third party, and supplies it to a response request command transmission unit 55.

A command transmission control unit 54 transmits a control command CC such as a start command to the reception side terminal 11, and receives a response message CCR to the control command CC transmitted from the reception side terminal 11.

A response request command transmission unit 55 transmits a response request command MC containing the authentication data RS generated by the authentication data generation unit 53, to the reception side terminal 11 via the communication unit 23.

A response reception unit 56 receives via the communication unit 23 a response message MCR transmitted from the reception side terminal 11, as a response to the transmitted response request command MC, and supplies the authentication data RR for the response assembled in the response message, to a response authentication unit 57.

In accordance with the authentication data RR for the response from the response reception unit 56 and the expected value QR for the authentication data RR generated by the expected value generation unit 52, the response authentication unit 57 authenticates whether the reception side terminal 11 is an authorized apparatus of the information communication system, and notifies the authentication result to a control judgment unit 58.

The control judgment unit 58 judges whether a response time RTT, measured by a response time measurement unit 59, of the reception side terminal 11 relative to the response request command MC, is longer than a predetermined time TL to thereby judge a communication distance (judge whether the reception side terminal is connected to the same LAN 1 as that of the transmission side terminal 11).

In accordance with the authentication result of the reception side terminal 11 and the judgment result of the communication distance, the control judgment unit 58 judges whether data transmission to the reception side terminal 11 is granted or not. In accordance with this judgment, the control judgment unit 58 controls the communication unit 23 to transmit the data stored in the transmission data storage unit 24 to the reception terminal 11.

In response to the notices from the response request command transmission unit 55 and response reception unit 56, the response time measurement unit 59 measures the response time RTT of the reception side terminal 11.

Next, the structure (FIG. 10) of the response control unit 22 will be described.

A control response communication control unit 71 receives the control command CC transmitted from the transmission terminal 11 and transmits the response message CCR to the control command CC to the transmission side terminal 11, respectively via the communication unit 23.

An expected value generation unit 72 makes the random challenge RC contained in the control command and received at the control response communication control unit 71 be subjected to a Keyed-Hash process similar to the case of the transmission side terminal 11 (authentication data generation unit 53), by using the secret key shared with the transmission terminal 11, generates the expected value QS for the command authentication data RS of the transmission side terminal 11 (the expected value QS having the same value as the corresponding authentication data RS), and supplies it to a command authentication unit 76.

An authentication data generation unit 73 makes the random challenge RC contained in the control command CC received at the control response communication control unit 71 be subjected to the Keyed-Hash process using the secret key shared by the transmission side terminal 11, generates the authentication data RR for the response not estimated by the third party, and supplies it to a response transmission unit 74.

In accordance with the authentication result of the command authentication unit 76, the response transmission unit 74 transmits the response message MCR to the response request command MC from the transmission side terminal 11 containing the authentication data RR for the response generated by the authentication data generation unit, to the transmission side terminal 11 via the communication unit 23.

A response request command reception unit 75 receives via the communication unit 23 the response request command MC transmitted from the transmission side terminal 11, and supplies the authentication data RS assembled in the command to a command authentication unit 76.

In accordance with the command authentication data from the response request command reception unit 75 and the expected value QS for the authentication data RS generated by the expected value generation unit 72, the command authentication unit 76 authenticates whether the transmission terminal 11 is an authorized apparatus of the information communication system, and notifies the authentication result to the response transmission unit 74.

Figure 11:
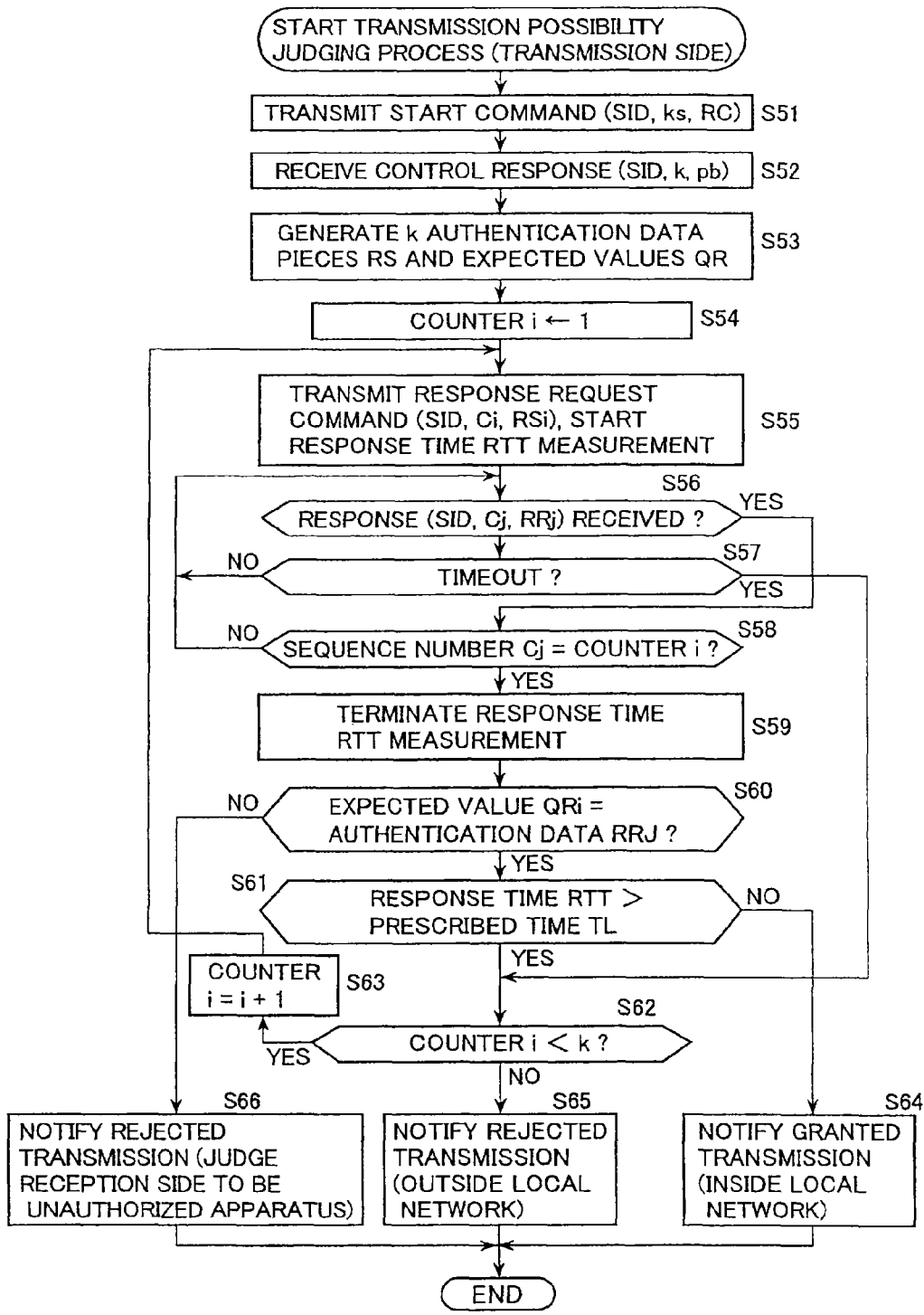
FIG. 11 is a flow chart illustrating another transmission grant judgment process.

Next, the operation of the transmission grant judgment unit shown in FIG. 9 will be described with reference to the flow chart shown in FIG. 11.

At Step S51 the control command communication control unit 54 of the transmission grant judgment unit 21 of the terminal 11 establishes a TCP connection with a reception side apparatus. It is assumed that the port number for the TCP connection is agreed beforehand between the transmission side terminal 11 and reception side apparatus. This step may be omitted if the TCP connection has already been established between the transmission side apparatus 11 and reception side apparatus.

The control command communication control unit 54 transmits a start command (control command CC) to the effect that the response time RTT measurement starts, to the reception side apparatus via the established TCP connection. This start command CC contains a session number SID, the random challenge RC and the number of retry times (measurement times) ks of measurement of the response time during one session executable by the transmission side terminal 11.

The session number SID is the number assigned to each of a series of authentication processes (one session) to be executed thereafter for the reception side apparatus. This number is shared by both the transmission and reception sides so that the authentication processes can be discriminated between respective sessions.

Communications of data (e.g., the response request command MC and its response message MCR) necessary for the measurement of the response time RTT are performed by UDP which does not resend packets. Therefore, depending upon the communication conditions, the response time measurement is not performed properly because of data loss during communications or other reasons. Packet transmission may be delayed by the influence of other communications on the network. From this reason, the response time RTT measurement is made to be retried (re-executed) several times. Since the numbers of retry times become different at the transmission side apparatus and reception side apparatus by their settings, in this example, the number of retry times (e.g., maximum number of retry times) of the transmission side apparatus is notified to the reception side apparatus.

Next, at Step S52 the control command communication control unit 54 receives the response message CCR to the start command CC from the reception side apparatus.

This response message CCR contains, in addition to the session number SID contained in the start command CC, the number of retry times k for the response time RTT measurement determined by the reception side, and a UDP port number pb for receiving the response request command MC. Namely, with this exchange of the start command CC and its response message CCR, the transmission side terminal 1 and reception side apparatus agree the number of retry times (measurement times) k for the response time RTT measurement, the session number SID and the UDP port number pb for an exchange of the response request command MC and its response message MCR.

The reception side apparatus determines, as the number of retry times k for the current response time RTT measurement, a smaller one of the number of retry times ks for the response time RTT measurement executable at the transmission side terminal TR and notified by the start command CC and the number of retry times for the response time RTT measurement executable at the reception side, and notifies it to the transmission side apparatus by using the response message CCR.

At Step S53 the expected value generation unit 52 makes the random challenge RC generated by the random challenge generation unit 51 be subjected to the Keyed-Hash process similar to the Keyed-Hash at the response control unit 22 (authentication data generation unit 73) of the reception side terminal 11, and generates the expected value QR for the authentication data RR of the reception side apparatus.

In this example, since the response time RTT measurement is performed a maximum of k times (since the response message MCR to the response request command MC is received a maximum of k times), the expected value QR is generated for each of the authentication data RR contained in the received k request command messages MCR at a maximum.

The authentication data generation unit 53 makes the random challenge RC generated by the random challenge generation unit 51 be subjected to the Keyed-Hash process, and generates the command authentication data RS.

In this example, since the response time RTT measurement is performed a maximum of k times (since the response request command MC is transmitted a maximum of k times), the authentication data RS is generated for each of the transmitted k response request commands MC at a maximum.

At Step S54 a counter i built in the control judgment unit 58 is initialized to 1. At this time, the expected value generation unit 52 supplies the response authentication unit 57 with the expected value QR (e.g., an expected value QRi generated at the i-th sequence) corresponding to the value of the counter i. The authentication data generation unit 53 also supplies the authentication data RSi corresponding to the value of the counter i to the response request command transmission unit 55.

At Step S55 the response request command transmission unit 55 transmits the response request command MC to the reception side apparatus through UDP communications at the UDP port number pb contained in the response CCR to the control command CC, the response request command MC containing the session number SID, and the authentication data RSi (authentication data RSi corresponding to the value of the counter i among k authentication data sets RS) supplied from the authentication data generation unit 53.

When the response request command transmission unit 55 transmits the response request command MC, it notifies this to the response time measurement unit 59. In response to this, the response time measurement unit 59 starts measuring the response time.

At Step S56 the response reception unit 56 judges whether the response message MCR is received from the reception side apparatus. If it is judged that the response message is not received, the flow advances to Step S57 whereat it is judged whether the response is waited for a predetermined time or longer (it is judged whether a predetermined time has lapsed after the response time RTT measurement starts at Step S55).

If it is judged at Step S57 that the predetermined time is not still lapsed, the flow returns to Step S56 to execute Step S56 and succeeding Steps. On the other hand, if it is judged at Step S57 that the predetermined time has lapsed, the flow advances to Step S62 whereat it is judged whether the value of the counter i is smaller than the number of retry times k (it is judged whether the response time RTT measurement is performed k times). If it is judged smaller (the measurement is not performed k times), the flow advances to Step S63 whereat the value of the counter i is incremented by 1 to thereafter return to Step S55.

Since a packet may not reach the communication partner when sending the response request packet MC by UDP, if the response message MCR is not received until a lapse of a predetermined time after the response request command MC is sent, the transmission side terminal 11 judges a failure of the current measurement and starts the next response time RTT measurement (the process at Step S55 and succeeding Steps start).

If it is judged at Step S56 that the response message MCR is received, the flow advances to Step S58 whereat the response reception unit 56 reads the response authentication data RRj and sequence number Cj contained in the received response message MCR, and supplies them to the response authentication unit 57.

The response authentication unit 57 judges whether the sequence number Cj supplied from the response reception unit 56 matches with the value of the counter i (the sequence number Ci of the transmitted response request command MC).

Description will be made later on the merit of confirming the sequence number Cj of the response message MCR and the sequence umber Ci of the response request command MC.

If it is judged at Step S58 do not match, the flow returns to Step S56 to execute Step S56 and succeeding Steps, whereas if it is judged to match, the flow advances to Step S59.

At Step S59 the response reception unit 56 supplies a notice END indicating that the response message MCR has been received, to the response time measurement unit 59. The response time measurement unit 59 terminates the response time RTT measurement started at Step S55, and supplied the measurement result (response time RTT) to the control judgment unit 58.

At Step S60 the response authentication unit 57 judges whether the response authentication data RRj supplied from the response reception unit 56 matches with the expected value QRi for the authentication data RRj generated by the expected value generation unit 52. If it is judged to match, the reception side terminal 11 is authenticated as an authorized terminal of the information communication system to thereafter advance to Step S61.

At Step S61 the control judgment unit 58 judges whether the response time RTT supplied from the response time measurement unit 59 is larger than the predetermined prescribed time TL.

The prescribed time TL is the time not longer than the response time RTT if the transmission side terminal 11 and the reception side apparatus are connected to the same LAN 1. Namely, if the response time RTT is longer than the prescribed time TL, it can be judged that the reception side apparatus is not connected to the same LAN 1 as that of the transmission side terminal 11. On the other hand, if the response time RTT is not longer (is equal to or shorter) than the prescribed time TL, it can be judged that the reception side apparatus is connected to the same LAN 1 as that of the transmission side terminal 11.

If it is judged at Step S61 YES (if it is judged from the response time RTT measurement at the i-th sequence that the reception side apparatus is not connected to the same LAN 1 as that of the transmission side terminal 11), the flow advances to Step S62 whereat the control judgment unit 58 judges whether the value of the counter i is smaller than the value k (whether the response time RTT measurement is retried k times). If it is judged smaller (if the response time RTT measurement is not performed k times), the flow advances to Step S63 whereat the value of the counter i is incremented by 1. At this time, the expected value generation unit 52 supplies the response authentication unit 57 with the expected value QRi corresponding to the new value of the counter i, whereas the authentication data generation unit 53 supplies the response request command transmission unit 55 with the authentication data RSi corresponding to the new value of the counter i.

Thereafter, the flow returns to Step S55 to execute Step S55 and succeeding Steps. Namely, the response time RTT measurement is performed k times at a maximum until the response message MCR, whose response time RTT is equal to or shorter than the prescribed time TL, is received.

If it is judged as NO at Step S61 (if the response message MCR whose response time RTT is equal to or shorter than the prescribed time TL), the flow advances to Step S64.

At Step S64 the control judgment unit 58 notifies the communication unit 23 (FIG. 3) of that the reception side apparatus is an apparatus to which transmission data can be sent (an authorized apparatus connected to the same LAN 1 as that of the transmission side terminal 11). The communication unit 23 reads predetermined transmission data from the transmission data storage unit 24 and transmits it to the reception side apparatus (terminal 11).

If it is judged at Step S62 that the value of the counter i is equal to or larger than k (if the response whose response time RTT is equal to or shorter then the prescribed time TL is not obtained even if the response time RTT measurement is performed k times), the flow advances to Step S65 whereat the control judgment unit 58 notifies the control command communication control unit 54 of that the reception side apparatus is an apparatus outside of the local network (an apparatus not connected to the same LAN 1 as that of the transmission side terminal 11). The control command communication control unit 54 transmits to the reception side apparatus the end command CC indicating that authentication of the reception side apparatus failed.

If it is judged at Step S60 that the response authentication data RRj does not match with its expected value QRi, the flow advances to Step S66 whereat the control judgment unit 58 notifies the control command communication unit 54 of that the reception side apparatus is an unauthorized apparatus. The control command communication control unit 54 transmits to the reception side apparatus the end command CC indicating that authentication of the reception side apparatus failed.

The transmission grant judgment process is executed in the manner described above.

In the above description, the k authentication data sets RS are generated at Step S53. Instead, at Step S55 each time the response request command MC is transmitted, the authentication data for the command may be generated.

Figure 12:
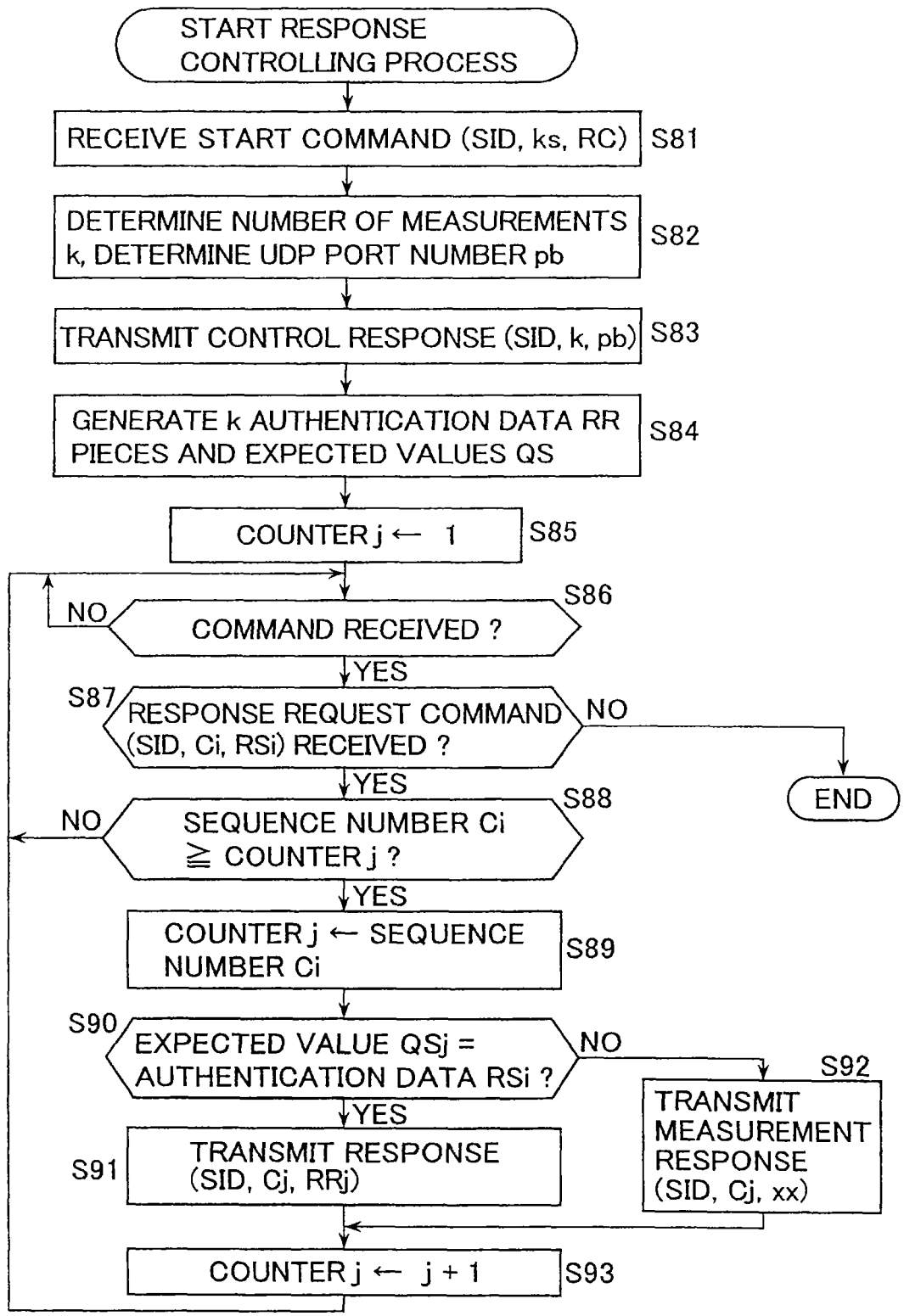
FIG. 12 is a flow chart illustrating another response process.

Next, the operation of the response control unit 22 of FIG. 10 will be described with reference to the flow chart of FIG. 12.

At Step S81 together with the transmission side apparatus, the control response communication control unit 71 of the response control unit 22 of the reception side terminal 11 establishes a TCP connection and receives the start command CC transmitted from the transmission side apparatus via the TCP connection (Step S51). The control response communication control unit 71 supplies the expected value generation unit 72 and authentication data generation unit 73 with the random challenge RC contained in the received start command CC.

Next, at Step S82 the response request command reception unit 75 determines a UDP port number pb to be used for receiving the response request command MC transmitted from the transmission side apparatus.

The response request command reception unit 75 also determines, as the number of retry times k for the current response time RTT measurement, a smaller one of the number of retry times ks for the response time RTT measurement executable at the transmission side terminal TR contained in the start command CC and the number of retry times for the response time RTT measurement executable at the reception side terminal 11.

At Step S83 the control response communication control unit 71 transmits the response message CCR to the transmission side apparatus via the TCP connection established at Step S81, the response message containing the session number SID, the number of retry times k for the response time RTT measurement and the UDP port number pb respectively contained in the control command CC received at Step S81. The transmission side apparatus receives the transmitted response message CCR (Step S52).

At Step S84 the authentication data generation unit 73 executes a Keyed-hash process relative to the random challenge RC supplied from the control response communication control unit 71, and generates the response authenticate data RR.

In this example, since the response time RTT measurement is performed k times at a maximum (the response message MCR to the response request command MC is transmitted k times at a maximum), the authentication data RR is generated for each of the transmitted k response messages MCR at a maximum.

The expected value generation unit 72 makes the random challenge RC supplied from the control response communication control unit 71 be subjected to a Keyed-Hash process similar to the Keyed-Hash process by the transmission grant judgment unit 21 (authentication data generation unit 53) of the transmission side terminal 11, and generates the expected value QS for the authentication data of the transmission side terminal 11.

In this example, since the response time RTT measurement is performed a maximum of k times (the response request command MC is received a maximum of k times), the expected value QS is generated for each of the authentication data sets RS contained in the received k response request commands MC at a maximum.

At Step S85 the value of a counter j built in the command authentication unit 76 is initialized to 1.

At Step S86 it stands by until a command is received, and when it is judged that a command is received, the flow advances to Step S87 whereat it is judged whether the received command is the response request command MC (Step S55). If it is judged as the response request command MC, the flow advances to Step S88.

At Step S88, the sequence number Ci contained in the received command is compared with the counter j and it is confirmed whether the sequence number Ci is equal to or larger than the counter j. If the sequence number is equal to or larger than the counter j, the flow advances to Step S89 whereat the counter j is set to the value of the sequence number Ci.

This is a countermeasure for making the counter j match with the sequence number Ci, if the command is lost or does not income in the sequential sequence.

At this time, the expected value generation unit 72 supplies the command authentication unit 76 with the expected value QS corresponding to the value of the counter j (e.g., the expected value QSj generated at the j-th sequence). The authentication data generation unit 73 supplies the response transmission unit 74 with the authentication data RRj corresponding to the value of the counter j.

Next, at Step S90 the command authentication unit 76 judges whether the authentication data RSi assembled in the response request command MC received from the response request command reception unit 75 matches with the expected value QSj generated by the expected value generation unit 72 (the expected value generated at the sequence indicated by the counter j). If it is judged to match, the transmission side terminal 11 is authenticated as an authorized terminal of the information communication system to thereafter advance to Step S91.

At Step S91 the command authentication unit 76 notifies the response transmission unit 74 of that the transmission side terminal 11 is the authorized apparatus. Then, the response transmission unit 74 transmits to the transmission side apparatus the response message MCR which contains the session number SID, the sequence number Cj representative of the value of the counter j and the authentication data RRj supplied from the authentication data generation unit 73.

On the other hand, if it is judged at Step S90 do not match, the flow advances to Step S92 whereat the command authentication unit 76 notifies this to the response transmission unit 74. Then, the response transmission unit 74 transmits to the transmission side apparatus a response message MCR containing the session number SID, the sequence number Cj representative of the value of the counter j, and authentication data RR (=xx) with which the transmission side apparatus fails the authentication of the reception side apparatus (Step S60).

If the response message MCR is transmitted at Step S91 or Step S92, the value of the counter j is incremented by 1 at Step S93 and thereafter the flow returns to Step S86 to execute Step S86 and succeeding Steps.

If it is judged at Step S88 that the value of the counter j is smaller than the sequence number Ci contained in the received command, the flow also returns to Step S86 to execute Step S86 and succeeding Steps.

If it is judged at Step S87 that the received command is not the response request command (if the received command is the end command CC (Steps S65 and S66)), the process is terminated.

Next, description will be made on the process at Step S58 shown in FIG. 11. In the process at Step S58, it is judged whether the sequence number Cj of the response message MCR from the reception side apparatus matches with the sequence number Ci (the value of the counter i) of the response request command MC. Since the correspondence between the response request command MC and the response message MCR is confirmed, the distance judgment by the response time RTT is not performed in accordance with the response message MCR not corresponding to the response request command MC (the response message MCR of another response request command MC).

Figure 13:
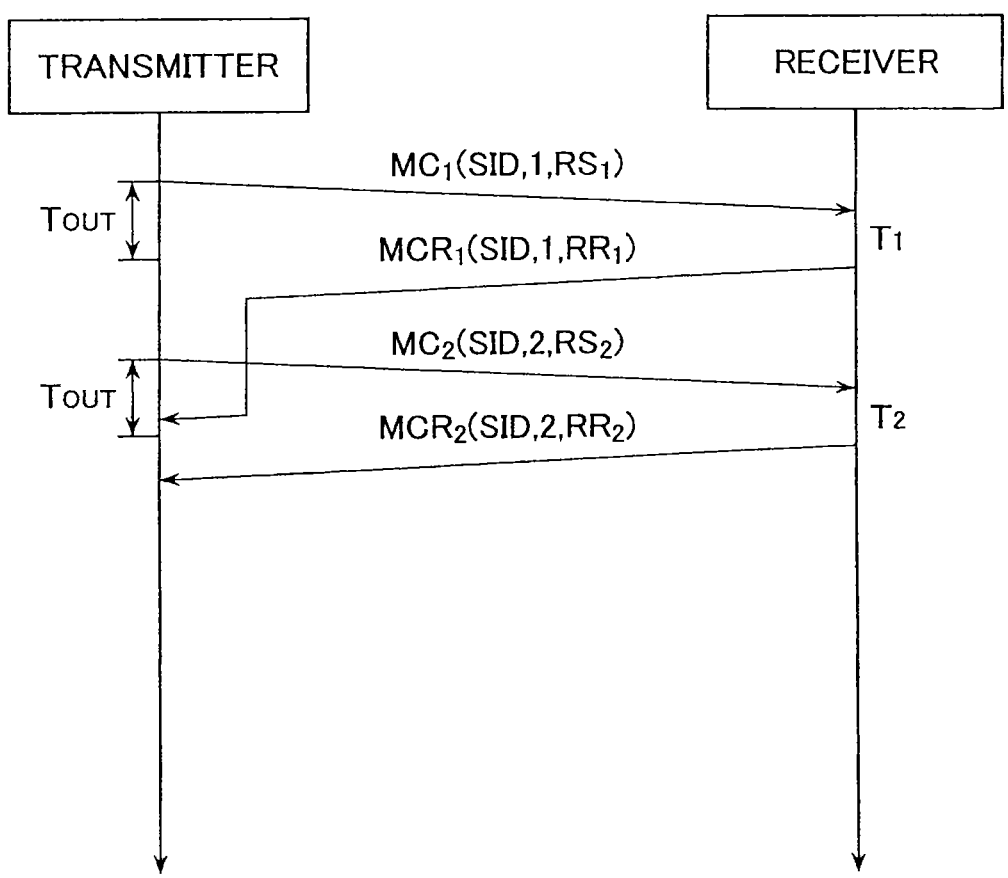
FIG. 13 is another diagram illustrating the operation of the terminal shown in FIG. 1.

For example, as shown in FIG. 13, it is assumed that the reception side apparatus takes a long time to transmit the response message MCR corresponding to the first response request message (Steps S91 and S92) and that the transmission side terminal 11 judges as the timeout (Step S57) and transmits the second response request command MC to the reception side apparatus. It is also assumed that the response message MCR corresponding to the first response request command MC is received at the transmission side terminal 11 (Step S56) after the second response request command MC is transmitted (Step S55) before the timeout or the second response request command MC (Step S57).

In the present invention, however, it is judged that the sequence number (=1) of the first response message MCR from the reception side apparatus is do not match with the sequence number (=2) of the second response request command MC. Therefore, the transmission side terminal 11 stands by (return to Step S56) until the response message MCR corresponding to the second response request command MC is received, so that even if the response message not corresponding to the response request command is received, the distance judgment by the response time RTT is not performed.

Next, the operation of an unauthorized terminal 11 will be described specifically.

Figure 14:
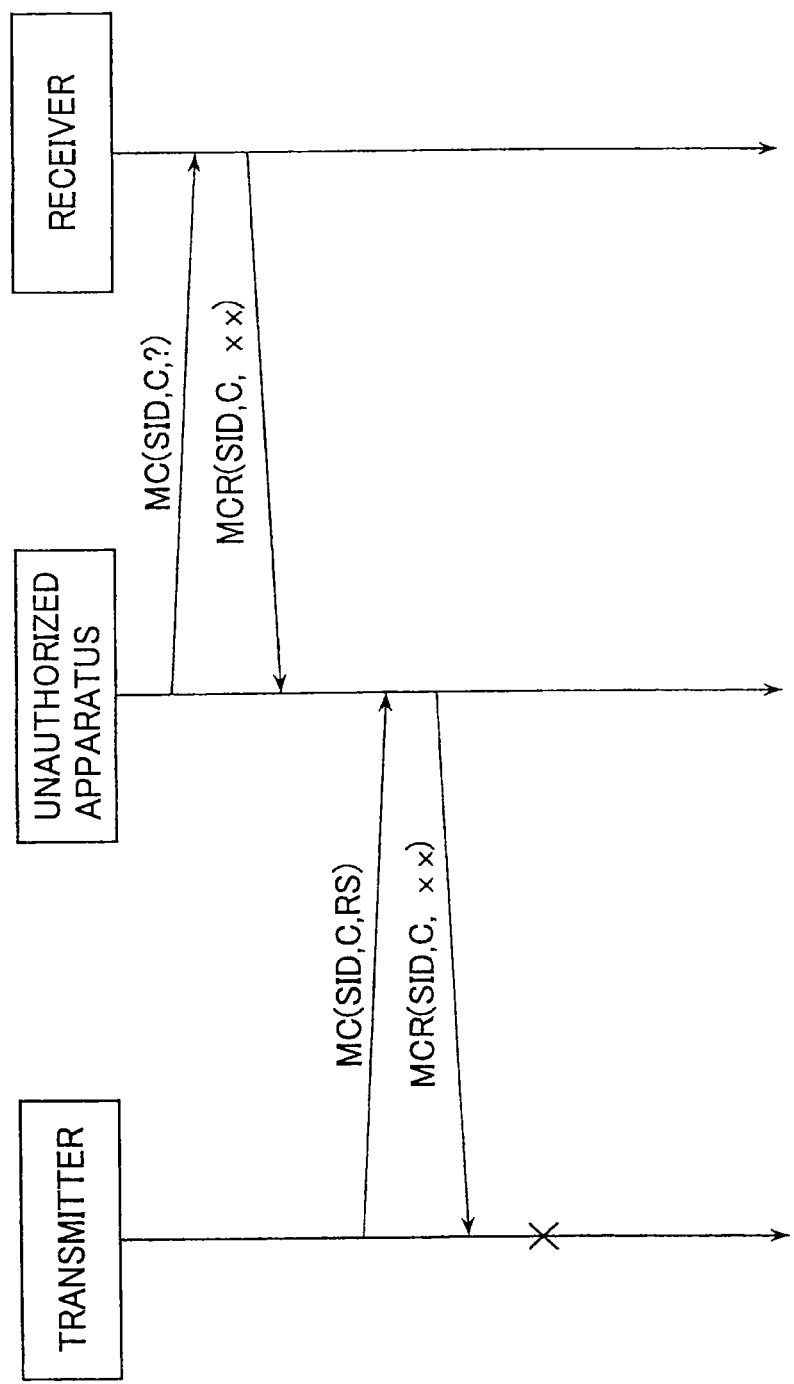
FIG. 14 is another diagram illustrating the operation of the terminal shown in FIG. 1.

For example, it is assumed that the unauthorized apparatus x connected to the same LAN 1 as that of the transmitter shown in FIG. 8 transmits a response request command in sequence to receive a response from the receiving apparatus. However, since the apparatus x does not have the secret key shared with the receiving apparatus, it cannot acquire the authentication data RS necessary for the authentication of the transmitter by the receiving apparatus. Therefore, as shown in FIG. 14, although the apparatus x transmits the response request command MC containing improper authentication data RS (=?), the receiving apparatus transmits the response message MCR containing the authentication data RR (=xx) with which the authentication of the receiving apparatus fails (Step S92). Even if the apparatus x transmits thereafter to the transmitter the response message MCR to the response request command MC sent from the transmitter, the apparatus x cannot be authenticated by the transmitter and the transmission data will not be transmitted to the apparatus x.

Figure 15:
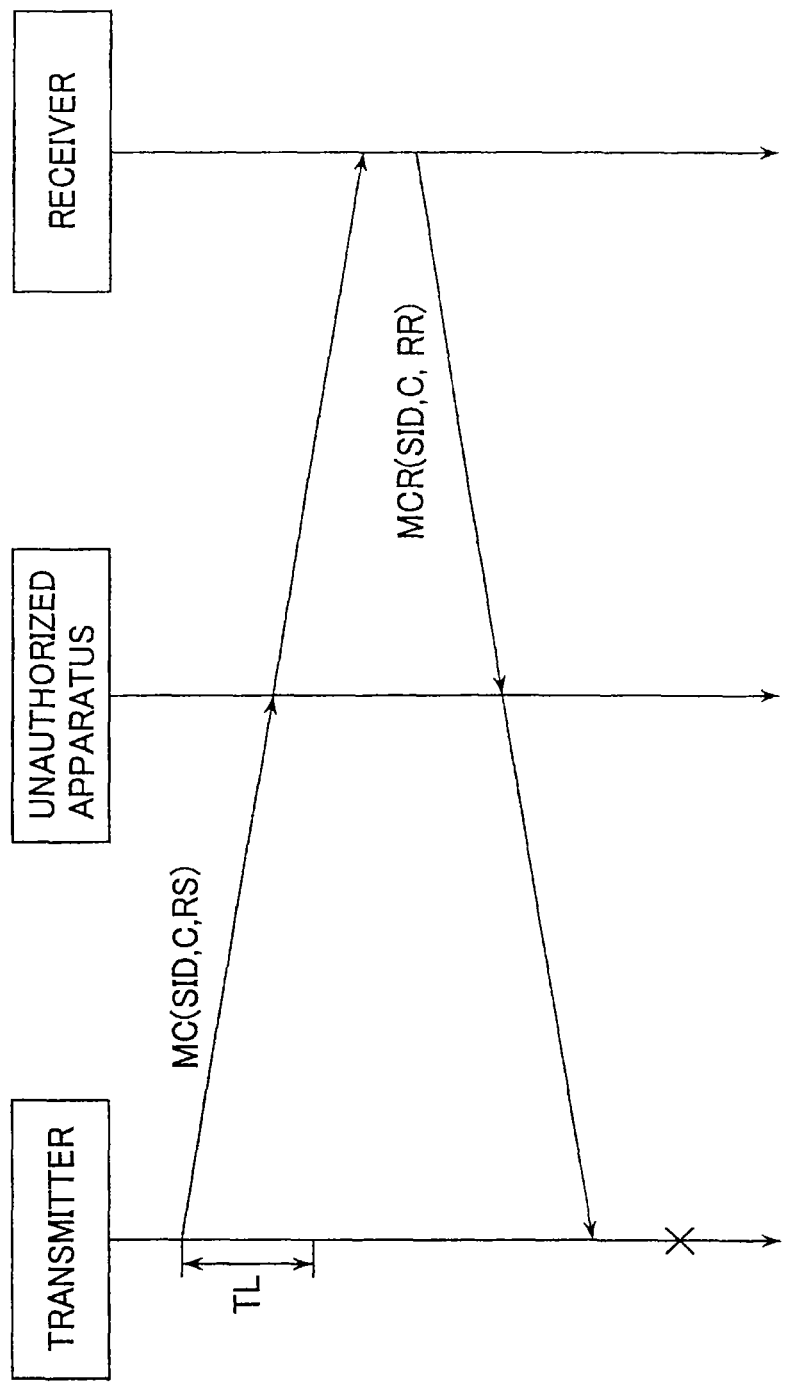
FIG. 15 is another diagram illustrating the operation of the terminal shown in FIG. 1.

It can be considered as shown in FIG. 15 that the unauthorized apparatus x receives the response request command MC from the transmitter, transmits it to the receiving apparatus and acquires the response message MCR containing the proper authentication data RR and that the apparatus transmits the acquired response message MCR to the transmitter.

However, in this case, the response request command MC is transmitted from the transmitter to the apparatus x and from the apparatus x to the receiving apparatus, and the response message MCR is transmitted from the receiving apparatus to the apparatus x and from the apparatus x to the transmitter. Therefore, the transmission paths of the response request command MC and the response message MCR become longer than the ordinary transmission path (transmission path between the transmitter and receiving apparatus). In this case therefore, since the response time RTT becomes longer than the prescribed time TL, the apparatus x is judged not connected to the same LAN 1 as that of the transmitter so that the apparatus x is not provided with the transmission data.

Although an above-described series of processes may be realized by hardware, they may be realized by software. If a series of processes are to be realized by software, the program constituting the software is installed in a computer and the computer executes the program to functionally realize the above-described transmission grant judgment unit 21 and response control unit 22.

Figure 16:
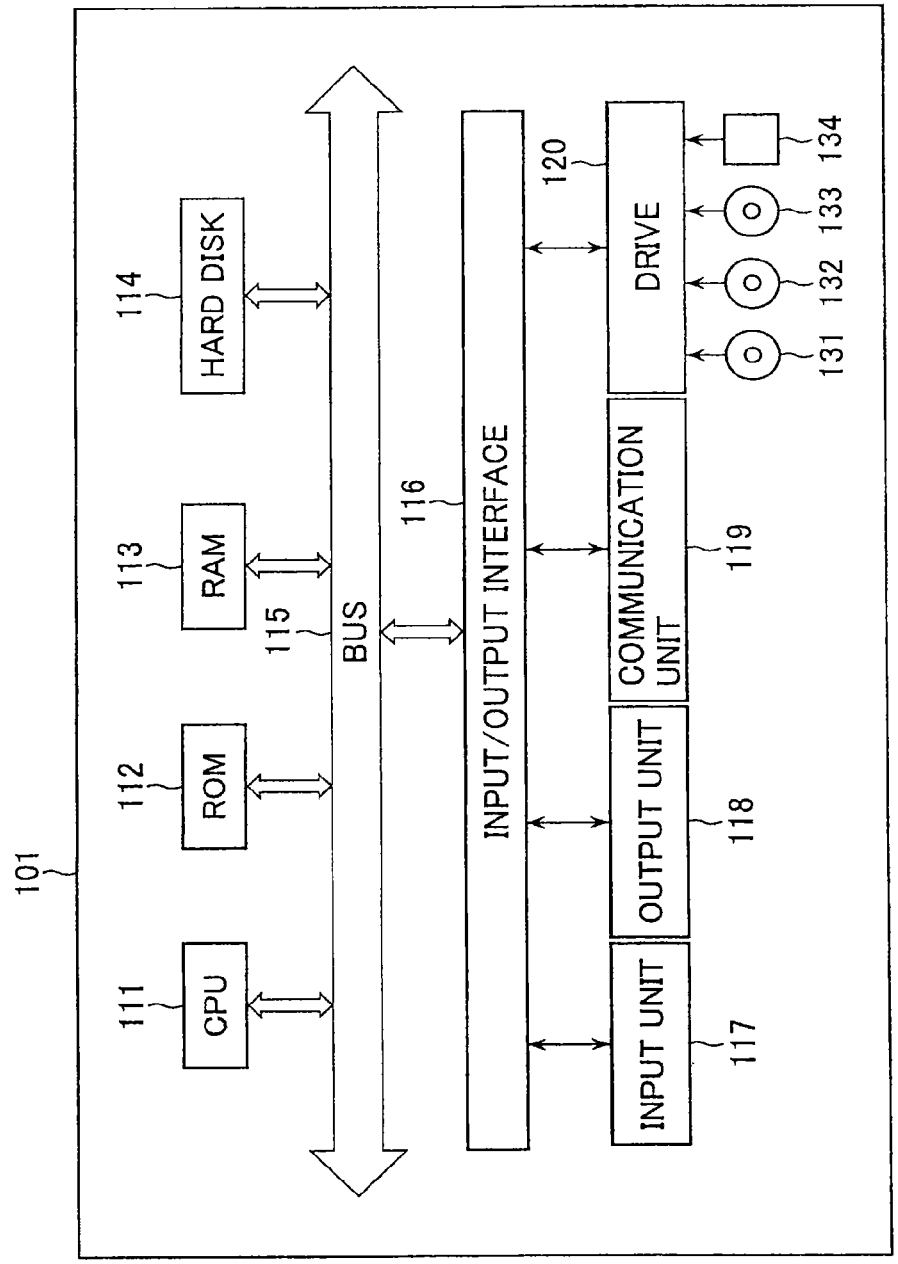
FIG. 16 is a block diagram showing an example of the structure of a personal computer.

FIG. 16 is a block diagram showing the structure of a computer 101 according to an embodiment, the computer functioning as the transmission grant judgment unit 21 and response control unit 22 described earlier. An input/output interface 116 is connected via a bus 115 to a CPU (Central Processing Unit) 111. When a user inputs a command from an input unit 117 such as a keyboard and a mouse to CPU 111 via the input/output interface 116, CPU 111 loads a program into a RAM (Random Access Memory) 113 and executes it to execute the above-described various processes. The program is stored in a storage medium such as: a ROM (Read Only Memory) 112; a hard disk 114; a magnetic disk 131, an optical disk 132, a magnetic optical disk 133 and a semiconductor memory 134 to be loaded on a drive 120. CPU 111 outputs the processed results, when necessary, for example, to an output unit 118 such as an LCD (Liquid Crystal Display) via the input/output interface 116. The program may be stored in advance in the hard disk 114 or ROM 112 to provide a user with the program bundled in the computer 101, the program may be provided as package media such as the magnetic disk 131, optical disk 132, magnetic optical disk 133 and semiconductor memory 134, or the program may be stored in the hard disk 114 from a satellite, a network or the like via a communication unit 119.

In this specification, steps describing the program provided by a recording medium contain not only a process to be executed time sequentially in the sequence of written statements but also a process to be executed parallel or independently without being processed time sequentially.

In this specification, a system may designate an entire apparatus constituted of a plurality of apparatuses.

INDUSTRIAL APPLICABILITY

According to the first and third inventions, a response time of a receiving apparatus can be measured properly.

According to the second and fourth inventions, information can be provided which is necessary for a transmitter to properly measure a response time.

What is claimed is:

1. An electronic device comprising:
circuitry configured to
share a secret key between the electronic device and another electronic device;
receive a first response request, the first response request transmitted from the another electronic device using Transmission Control Protocol (TCP) and including first authentication data generated at the another electronic device;
generate a first response message based on the first response request, the first response message transmitted to the another electronic device and generated based on the secret key;

receive a second response request, which is transmitted from the another electronic device after the another electronic device receives the first response message; and generate a second response message based on the second response request, the second response message transmitted to the another electronic device and including second authentication data generated based on the secret key, wherein the electronic device is authorized to receive data from the another electronic device when the second authentication data matches expected authentication information generated by the another electronic device based on the secret key and a predetermined time elapsed from a transmission of the second response request does not expire before the second response message is received by the another electronic device.

2. The electronic device of claim 1, wherein the secret key is shared between the electronic device and another electronic device.

3. The electronic device of claim 2, wherein the secret key is shared between the electronic device and the another electronic device before the first response request is received.

4. The electronic device of claim 3, wherein the time elapsed includes a time between transmission of the second response request and reception of the second response message.

5. The electronic device of claim 4, wherein the electronic device is not authorized to receive data from the another electronic device when the second authentication data does not match the expected authentication information generated by the another electronic device or when the predetermined time elapsed from transmission of the second response request expires before the second response message is received by the another electronic device.

6. The electronic device of claim 5, wherein the circuitry is configured to transmit the second response message via a same TCP connection through which the first response request is received.

7. The electronic device of claim 5, wherein the circuitry is configured to increment a counter by one when transmitting the second response message.

8. The electronic device of claim 5, wherein the circuitry includes a processor configured to execute a program stored in memory and an interface connected to a communication interface, which is configured to communicate with the another electronic device.

9. The electronic device of claim 8, wherein the circuitry is configured to output a video signal to a display.

10. The electronic device of claim 5, further comprising: a user interface configured to receive a user input.

11. The electronic device of claim 10, further comprising: a memory configured to store data to be transmitted to the another electronic device.

12. The electronic device of claim 11, further comprising: a communication interface.

13. The electronic device of claim 12, wherein the communication interface is an Ethernet interface.

14. The electronic device of claim 13, wherein the electronic device is a target for a locality check by the another electronic device.

15. An electronic device comprising:

means for sharing a secret key between the electronic device and another electronic device;

means for receiving a first response request, the first response request transmitted from the another electronic device using Transmission Control Protocol (TCP) and including first authentication data generated at the another electronic device;

means for generating a first response message based on the first response request, the first response message transmitted to the another electronic device and generated based on the secret key;

means for receiving a second response request, which is transmitted from the another electronic device after the another electronic device receives the first response message; and means for generating a second response message based on the second response request, the second response message transmitted to the another electronic device and including second authentication data generated based on the secret key, wherein the electronic device is authorized to receive data from the another electronic device when the second authentication data matches expected authentication information generated by the another electronic device based on the secret key and a predetermined time elapsed from a transmission of the second response request does not expire before the second response message is received by the another electronic device.

16. A method performed by an electronic device, the method comprising:

sharing a secret key between the electronic device and another electronic device;

receiving a first response request, the first response request transmitted from the another electronic device using Transmission Control Protocol (TCP) and including first authentication data generated at the another electronic device;

generating a first response message based on the first response request, the first response message transmitted to the another electronic device and generated based on the secret key;

receiving a second response request, which is transmitted from the another electronic device after the another electronic device receives the first response message; and generating a second response message based on the second response request, the second response message transmitted to the another electronic device and including second authentication data generated based on the secret key, wherein the electronic device is authorized to receive data from the another electronic device when the second authentication data matches expected authentication information generated by the another electronic device based on the secret key and a predetermined time elapsed from a transmission of the second response request does not expire before the second response message is received by the another electronic device.

17. A non-transitory computer-readable medium including computer-program instructions, which when executed by an electronic device, cause the electronic device to:

share a secret key between the electronic device and another electronic device;

receive a first response request, the first response request transmitted from the another electronic device using Transmission Control Protocol (TCP) and including first authentication data generated at the another electronic device;

generate a first response message based on the first response request, the first response message transmitted to the another electronic device and generated based on the secret key;

receive a second response request, which is transmitted from the another electronic device after the another electronic device receives the first response message; and generate a second response message based on the second response request, the second response message transmitted to the another electronic device and including second authentication data generated based on the secret key, wherein the electronic device is authorized to receive data from the another electronic device when the second authentication data matches expected authentication information generated by the another electronic device based on the secret key and a predetermined time elapsed from a transmission of the second response request does not expire before the second response message is received by the another electronic device.

* * * * *